(12) United States Patent
Yanagiwara

(10) Patent No.: US 9,621,753 B2
(45) Date of Patent: Apr. 11, 2017

(54) IMAGE READING APPARATUS, CONTROL METHOD FOR IMAGE READING APPARATUS, AND PROGRAM

(71) Applicant: CANON KABUSHIKI KAISHA, Tokyo (JP)

(72) Inventor: Yuichi Yanagiwara, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/967,119

(22) Filed: Dec. 11, 2015

(65) Prior Publication Data

US 2016/0191736 A1 Jun. 30, 2016

(30) Foreign Application Priority Data

Dec. 26, 2014 (WO) .................. PCT/JP2014/084598

(51) Int. Cl.
*H04N 1/04* (2006.01)
*H04N 1/00* (2006.01)
(Continued)

(52) U.S. Cl.
CPC .......... *H04N 1/00801* (2013.01); *B41J 29/38* (2013.01); *G06K 15/02* (2013.01);
(Continued)

(58) Field of Classification Search
CPC ...... H04N 5/3675; H04N 1/193; H04N 1/409; H04N 1/62; H04N 5/3577; H04N 2201/0094; G06K 9/00362; G06K 15/1219; G01T 1/2018; G01T 1/2928; G09G 3/3688; G09G 1/00; G09G 2300/0426; G09G 2310/0275

USPC ....... 358/518, 483, 509, 461, 463, 482, 505, 358/514, 520, 1.9, 474, 475, 494, 521, 358/523, 409, 443, 453, 472, 478, 496, 358/500, 504, 513, 515, 519, 522, 537; 396/104, 123, 213, 228, 229, 144

See application file for complete search history.

(56) References Cited

U.S. PATENT DOCUMENTS 5,252,818 A * 10/1993 Gerlach ................. H04N 1/401
250/208.1
6,449,047 B1 * 9/2002 Bao .................... G01D 5/35383
356/478
(Continued)

FOREIGN PATENT DOCUMENTS

JP H04142860 A 5/1992
JP H04256279 A 9/1992
(Continued)

*Primary Examiner* — Negussie Worku
(74) *Attorney, Agent, or Firm* — Canon USA, Inc. IP Division

(57) ABSTRACT

An apparatus includes an image sensor that has a plurality of sensor chips having photoelectric conversion elements and that outputs pixel signals from a plurality of output channels; identifying means that identifies a width of a document to be read by the image sensor; and signal control means that controls signals to be output from the image sensor. In the image sensor, different sensor chips at an interval of the number of channels of the output channels are connected to each output channel, and the signal control means controls output of a pixel signal of each sensor chip based on the identified document width.

22 Claims, 20 Drawing Sheets

(51) Int. Cl.
  *B41J 29/38*      (2006.01)
  *G06K 15/02*      (2006.01)

(52) U.S. Cl.
  CPC ....... *H04N 1/0071* (2013.01); *H04N 1/00737* (2013.01); *H04N 1/0461* (2013.01)

(56) References Cited

U.S. PATENT DOCUMENTS

| | | | | |
|---|---|---|---|---|
| 7,158,272 | B2 * | 1/2007 | Hiromatsu | H04N 1/486 250/208.1 |
| 7,738,011 | B2 * | 6/2010 | Ito | H04N 5/232 348/207.11 |
| 8,194,291 | B2 * | 6/2012 | Kato | H04N 1/0083 358/474 |
| 8,704,897 | B1 * | 4/2014 | Cutcliffe | H04N 5/23203 250/208.1 |
| 8,743,231 | B2 * | 6/2014 | Yamagata | H04N 1/2158 348/222.1 |
| 2004/0105135 | A1 * | 6/2004 | Sawada | H04N 1/0318 358/509 |
| 2005/0094225 | A1 * | 5/2005 | Hu | H04N 1/191 358/493 |
| 2005/0206968 | A1 * | 9/2005 | Sodeura | H04N 1/00002 358/474 |
| 2007/0002399 | A1 * | 1/2007 | Kato | H04N 1/0083 358/486 |
| 2007/0002409 | A1 * | 1/2007 | Oguri | H04N 3/1581 358/514 |
| 2009/0195842 | A1 * | 8/2009 | Sasaki | H04N 1/031 358/474 |
| 2010/0253985 | A1 * | 10/2010 | Kurimoto | H04N 1/484 358/505 |

FOREIGN PATENT DOCUMENTS

| | | |
|---|---|---|
| JP | 2003234878 A | 8/2003 |
| JP | 2009188485 A | 8/2009 |
| JP | 2014160983 A | 9/2014 |

* cited by examiner

FIG. 6

| DOCUMENT SIZE | En | DOCUMENT AREA | | Ti | PIXEL OUTPUT |
|---|---|---|---|---|---|
| | | A3 | A4 | | |
| A3 | 0 | WITHIN READING AREA | OUTSIDE READING AREA | THROUGH | OUTPUT |
| A3 | 1 | WITHIN READING AREA | WITHIN READING AREA | THROUGH | OUTPUT |
| A4 | 0 | WITHIN READING AREA | OUTSIDE READING AREA | MASK | MASK |
| A4 | 1 | WITHIN READING AREA | WITHIN READING AREA | THROUGH | OUTPUT |

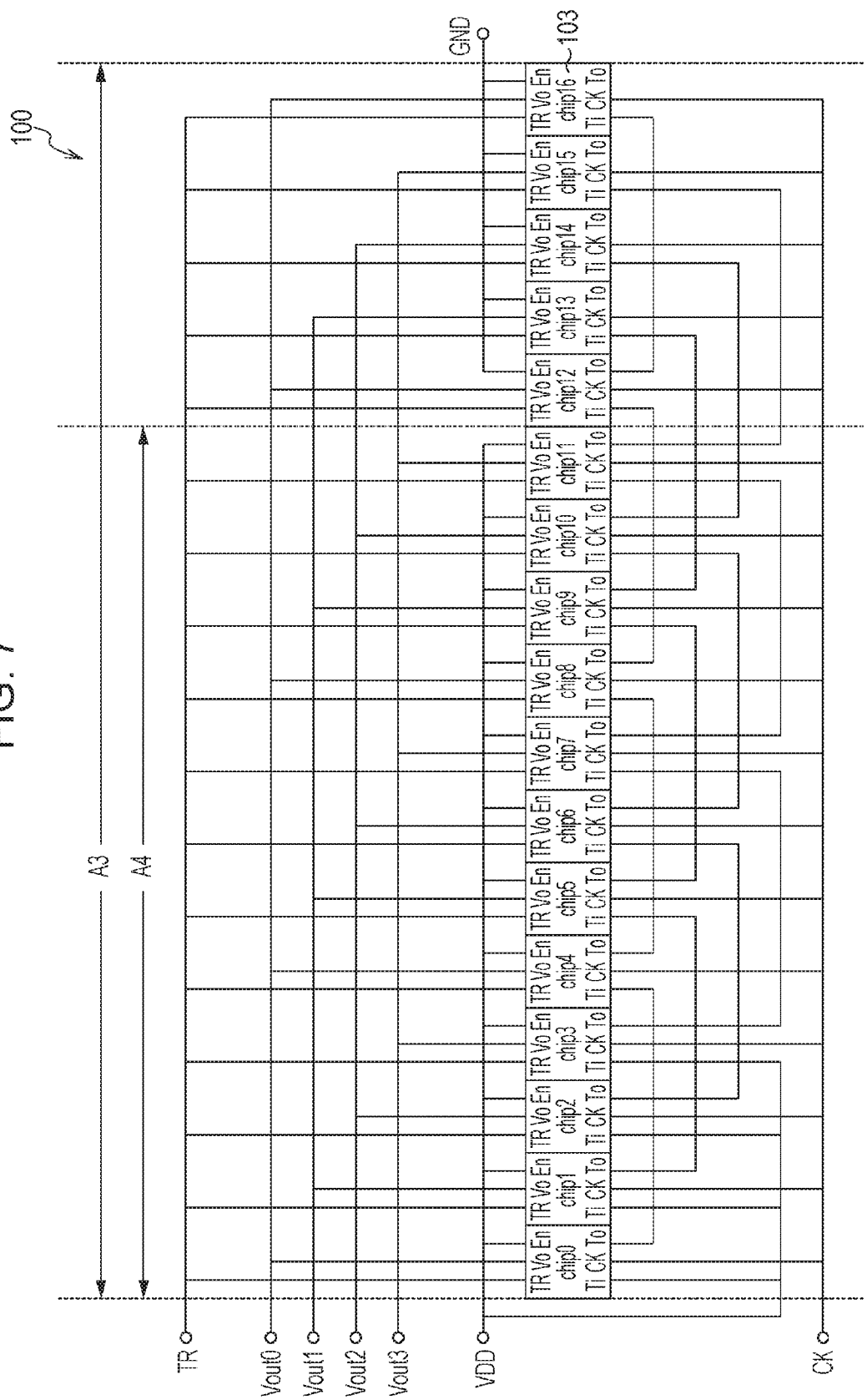

FIG. 10

| DOCUMENT SIZE | EnA | EnB | DOCUMENT AREA ||| Ti | PIXEL OUTPUT |
| --- | --- | --- | --- | --- | --- | --- | --- |
| | | | A3 | A4 | A5 | | |
| A3 | 0 | 0 | WITHIN READING AREA | OUTSIDE READING AREA | OUTSIDE READING AREA | THROUGH | OUTPUT |
| A3 | 0 | 1 | - | - | - | (MASK) | (MASK) |
| A3 | 1 | 0 | WITHIN READING AREA | WITHIN READING AREA | OUTSIDE READING AREA | THROUGH | OUTPUT |
| A3 | 1 | 1 | WITHIN READING AREA | WITHIN READING AREA | WITHIN READING AREA | THROUGH | OUTPUT |
| A4 | 0 | 0 | WITHIN READING AREA | OUTSIDE READING AREA | OUTSIDE READING AREA | MASK | MASK |
| A4 | 0 | 1 | - | - | - | (MASK) | (MASK) |
| A4 | 1 | 0 | WITHIN READING AREA | WITHIN READING AREA | OUTSIDE READING AREA | THROUGH | OUTPUT |
| A4 | 1 | 1 | WITHIN READING AREA | WITHIN READING AREA | WITHIN READING AREA | THROUGH | OUTPUT |
| A5 | 0 | 0 | WITHIN READING AREA | OUTSIDE READING AREA | OUTSIDE READING AREA | MASK | MASK |
| A5 | 0 | 1 | - | - | - | (MASK) | (MASK) |
| A5 | 1 | 0 | WITHIN READING AREA | WITHIN READING AREA | OUTSIDE READING AREA | MASK | MASK |
| A5 | 1 | 1 | WITHIN READING AREA | WITHIN READING AREA | WITHIN READING AREA | THROUGH | OUTPUT |

IN ( ), IT IS MASKED SINCE THERE IS NO USE CASE IN ( ).

FIG. 16

| DOCUMENT SIZE | COUNT VALUE OF COUNTER TR | To | PIXEL OUTPUT OF NEXT CHIP |
|---|---|---|---|
| A3 | - | THROUGH | OUTPUT |
| A4 | NUMBER OF PIXELS EQUIVALENT TO TWO CHIPS | MASK | MASK |
| A4 | OTHER THAN NUMBER OF PIXELS EQUIVALENT TO TWO CHIPS | THROUGH | OUTPUT |

IMAGE READING APPARATUS, CONTROL METHOD FOR IMAGE READING APPARATUS, AND PROGRAM

TECHNICAL FIELD

The present invention relates to an image reading apparatus that reads a document image, a control method for the image reading apparatus, and a program thereof.

BACKGROUND ART

Image reading apparatuses that read a document image are applied to devices such as scanners, copy machines, and facsimile machines. A CIS (Contact Image Sensor) used in an image reading apparatus has mounted thereon a plurality of censor chips, and this enables an increase in the reading speed by having a plurality of output channels and performing parallel data output (see PTL 1).

CITATION LIST

Patent Literature

PTL 1 Japanese Patent Laid-Open No. 2009-188485

However, for example, in the case of reading a document that is narrower in width, such as an A4 document, with an image reading apparatus using a CIS capable of reading an A3 document, a configuration such as that in PTL 1 outputs pixels from all sensor chips arranged in the CIS even in a portion outside a reading range. Therefore, the amount of time taken to read one line is the same as that of an A3 document, and it takes a longer time than that in the case of reading with an image reading apparatus using a CIS capable of reading an A4 document. That is, there is a problem that the image reading time is determined by the size of an image sensor, regardless of the size of a document, and the image reading speed becomes lower as the size of an image sensor becomes greater.

SUMMARY OF INVENTION

An apparatus according to the present invention includes an image sensor that has a plurality of sensor chips having photoelectric conversion elements and that outputs pixel signals from a plurality of output channels; identifying means that identifies a width of a document to be read by the image sensor; and signal control means that controls signals to be output from the image sensor. In the image sensor, different sensor chips at an interval of the number of channels of the output channels are connected to each output channel. The signal control means controls output of a pixel signal of each sensor chip based on the identified document width.

Further features of the present invention will become apparent from the following description of exemplary embodiments with reference to the attached drawings.

BRIEF DESCRIPTION OF DRAWINGS

FIG. 6 is a detailed explanatory diagram of Ti through/mask control of the sensor chip according to the first embodiment.
FIG. 7 is a diagram of a CIS according to the first embodiment.
FIG. 10 is a detailed explanatory diagram of Ti through/mask control of the sensor chip according to the second embodiment.
FIG. 16 illustrates details of Ti through/mask control of the sensor chip according to the third embodiment.

DESCRIPTION OF EMBODIMENTS

First Embodiment

Hereinafter, an embodiment of the present invention will be described using the drawings. Note that the relative positions, shapes, and so forth of components in an apparatus used in this embodiment are merely illustrative, and they are not limited only thereto.

Figure 1:
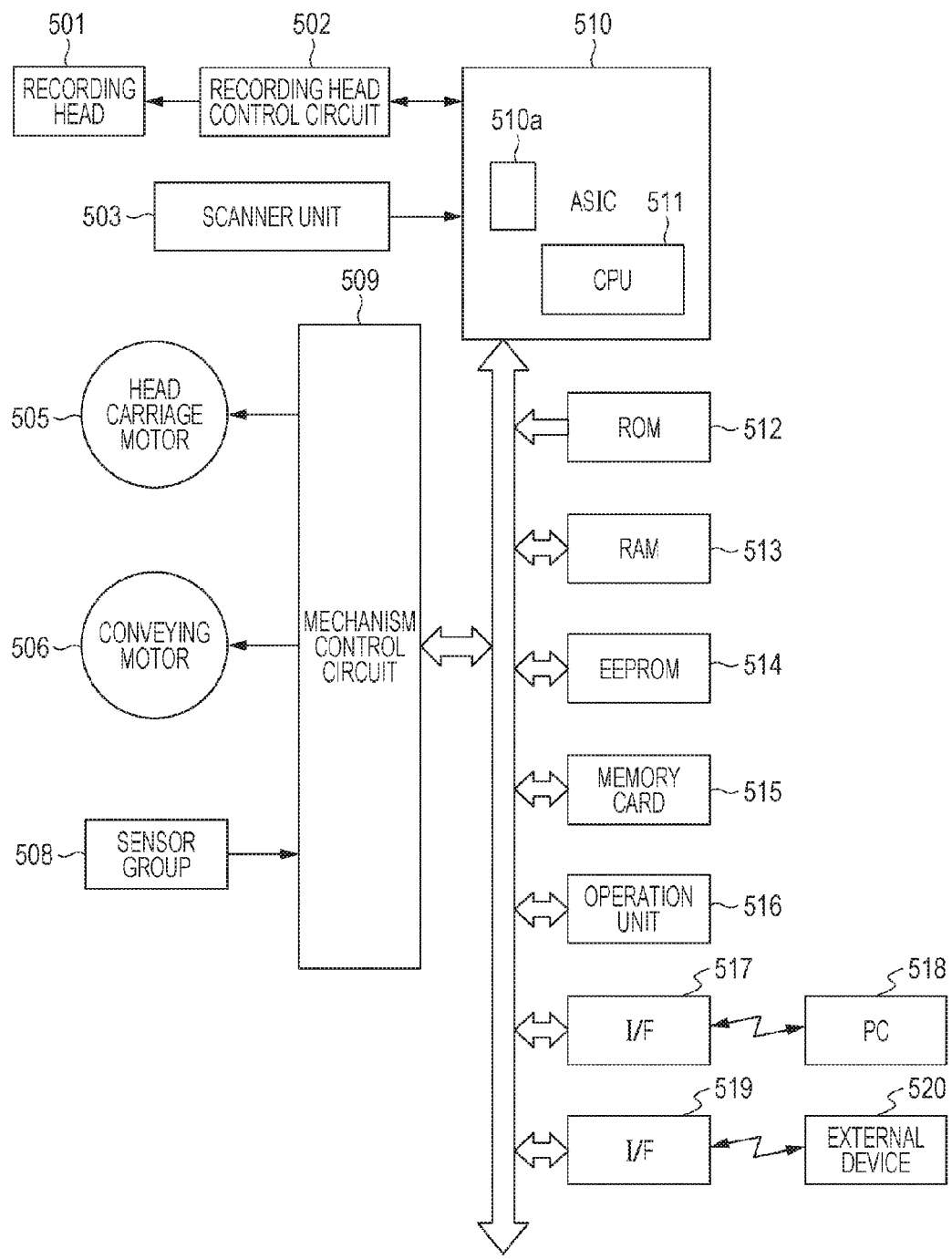
FIG. 1 is a diagram of an image reading apparatus according to a first embodiment.

FIG. 1 is a schematic diagram of a printer serving as an example of an image reading apparatus according to the embodiment. Although a printer with a reading function and a printing function is discussed by way of example in FIG. 1, the image reading apparatus is not limited thereto, and the image reading apparatus may be configured only with an image reading apparatus, or may be a complex apparatus that additionally has a FAX function and so forth.

As illustrated in FIG. 1, the printer includes a recording control circuit 509, an ASIC 510, a ROM 512, a RAM 513, an EEPROM 514, a memory card 515, an operation unit 516, an I/F 517, and an I/F 519, and these components are connected to one another by a system bus.

The ASIC 510 includes a CPU 511 and a reading controller 510a, and controls the overall operation of each unit. The CPU 511 is a central processing unit in the form of a microprocessor (microcomputer), and controls the overall printer operation by executing a program and activating hardware. The reading controller 510a controls driving of an image sensor such as a CIS (Contact Image Sensor) and a later-described AFE unit.

The ROM 512 stores a program corresponding to a procedure executed by the ASIC 510. The RAM 513 is used as a work area for the CPU 511, and temporarily saves parameters and image data for the ASIC 510 to execute the procedure. The EEPROM 514 saves the state of a recording head 501 even when the power of the printer is turned off. The memory card 515 saves image data captured with a digital camera, for example.

The operation unit 516 is for the user to perform various operations, and includes, for example, hardware keys and a display unit for presenting to the user (notifying the user of) various items of information. The display unit includes, for example, a touchscreen. The display unit may include an audio generator or the like, and may be configured to notify the user by outputting acoustics (buzzer, audio, etc.) based on acoustic information.

Furthermore, the interface (I/F) 517 and the interface (I/F) 519 are interfaces (I/Fs) with external devices. For example, a personal computer (PC) 518 is connected via the interface 517. In addition, an external device 520 such as a digital camera or an optical disk is connected via the interface 519. Via the interface 517 and the interface 519, image data can be input and output to and from the printer and the external devices.

The printer further includes the recording head 501, a recording head control circuit 502, and a scanner unit 503. The recording head control circuit 502 and the scanner unit 503 are connected to the ASIC. Here, a recording unit is a portion that includes a recording head and performs a recording operation, and a reading unit is a portion that includes a scanner unit and performs a reading operation.

The recording head control circuit 502 generates a drive pulse for electrically controlling the recording head 501 to eject ink on the basis of image data. The scanner unit 503 is a so-called reading unit that reads an image. Note that the configuration of the scanner unit 503 will be described in detail later.

The printer further includes a head carriage motor 505, a conveying motor 506, and a sensor group 508, and these components are connected to the recording control circuit 509. The mechanism control circuit 509 is a circuit that controls and manages various motors and sensors.

The head carriage motor 505 is a motor that moves a head carriage. Note that the head carriage has mounted thereon the recording head 501 and ink tanks of respective colors, and performs recording by ejecting ink droplets to a recording sheet while moving in a direction orthogonal to the carrying direction, along a shaft that supports the head carriage. Although the recording unit that conveys the carriage in a direction that crosses the conveying direction has been discussed by way of example in the embodiment, the recording unit is not limited thereto, and may include, for example, a line head that has nozzle arrays of respective colors along the conveying direction.

Figure 2:
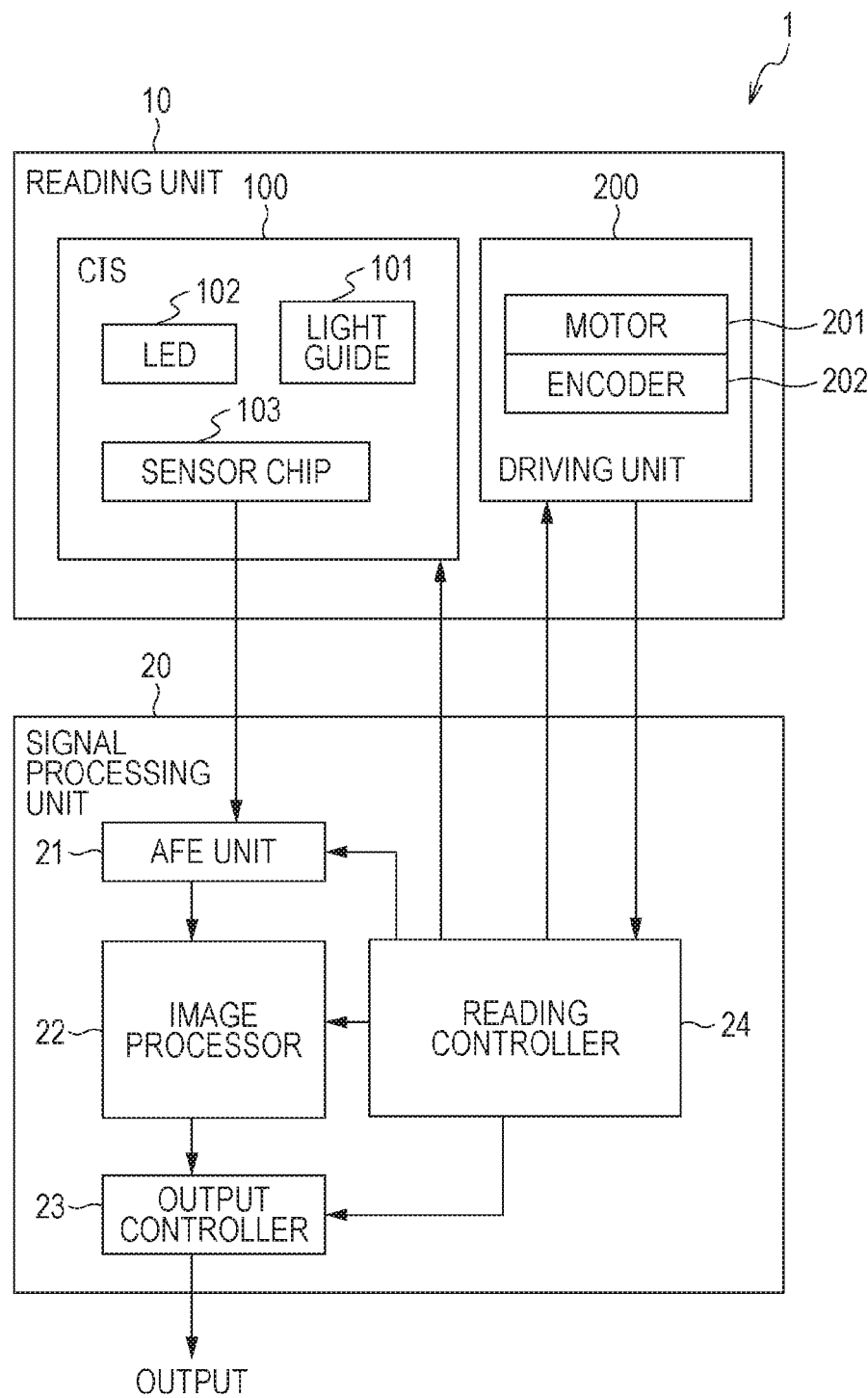
FIG. 2 is a diagram of the image reading apparatus according to a first embodiment.

The conveying motor 506 is a motor for conveying a recording medium. The sensor group 508 is a sensor group for monitoring the operating state of the recording unit and the scanner unit. Using FIG. 2, the configuration of an image reading apparatus 1 included in the printer will be described. The image reading apparatus 1 includes a reading unit 10 and a signal processing unit 20.

The reading unit 10 corresponds to the above-described scanner unit 501, and includes a CIS 100 and a driving unit 200.

The CIS 100 includes a light guide 101, an LED 102, and a sensor chip 103. The sensor chip 103 converts received light to electric charge, and outputs the electric charge as an electric signal. A plurality of sensor chips 103 according to the embodiment are arranged in a main scanning direction in the CIS 100, and these plural sensor chips 103 are configured to read one line. By separating pixel output to a plurality of lines, reading can be made faster. In the embodiment, the CIS 100 that is used is one that has an A3 size, and its main scanning maximum resolution is 1200 dpi.

In the CIS 100, the LED 102 irradiates a document face with light via the light guide 101, light reflected from the document face is converted to electric signals by photodiodes of the sensor chips 103, and the electric signals are output as image signals to the signal processing unit 20.

The driving unit 200 includes a motor 201 and an encoder 202. The motor 201 is a scanner carriage motor that moves a scanner carriage that has mounted thereon the scanner unit 503. The encoder 202 is a sensor that detects the rotating speed and the rotating direction of the motor 201, and is an optical encoder in the embodiment.

In the case of the image reading apparatus 1 that is a flatbed type, the image reading apparatus 1 is a flatbed type, the CIS 100 and the driving unit 200 are configured as one scanner unit, and the CIS 100 is conveyed. in a certain direction with respect to a sheet by using rotation of the motor 201. Note that the rotating speed and the rotating direction of the motor 201 are controlled using the encoder 202. In contrast, in the case of the image reading apparatus 1 that is an ADF type, the CIS 100 is fixed, and a document is conveyed in a certain direction. In the case of the ADF type, both sides of a document can be simultaneously read by arranging two CISs facing each other. It is assumed in the embodiment that the image reading apparatus 1 is a flatbed type in which a document reference is adjusted to the left edge of the CIS.

The signal processing unit 20 includes an AFE unit 21, an image processor 22, an output controller 23, and a reading controller 24, and is part of the ASIC 510 in FIG. 1 in the embodiment. Note that the reading controller 24 corresponds to the reading controller 510a in FIG. 1.

The AFE unit 21 samples pixel data output from the reading unit 10 on a pixel-by-pixel basis, and converts the sampled pixel data to a digital signal. The image processor 22 performs image processing of pixel data obtained by conversion performed by the AFE unit 21. The output controller 23 performs output control by outputting an image signal that has been subjected to image processing by the image processor 22, as an image file or a printed matter.

The reading controller 24 controls the reading unit 10 and the signal processing unit 20, and controls the overall image reading apparatus 1. Specifically, the reading controller 24 performs light emitting control of the LED 102, reading control of the sensor chips 103, driving control of the motor 201 and the encoder 202, control of the AFE unit 21, control of the image processor 22, and control of the output controller 23. The reading controller 24 controls signals in accordance with a reading mode, such as a document size and a resolution. Designation of the reading mode is set by the user using the operation unit 516. Designation of the document size may be set by the user using the operation unit 516, or may be automatically detected by the image reading apparatus 1 using a sheet width detection sensor.

The signal processing unit 20 can be configured with the ASIC 510 or an FPGA including one chip or a plurality of chips. Although the AFE unit 21 is included in the signal processing unit 20 in the embodiment, the configuration is not limited thereto, and the AFE unit 21 may be provided in the reading unit 10. In the case of providing the AFE unit 21 in the reading unit 10, high-speed reading can be performed by transferring digital signals to the signal processing unit 20 using LVDS.

Figure 3:
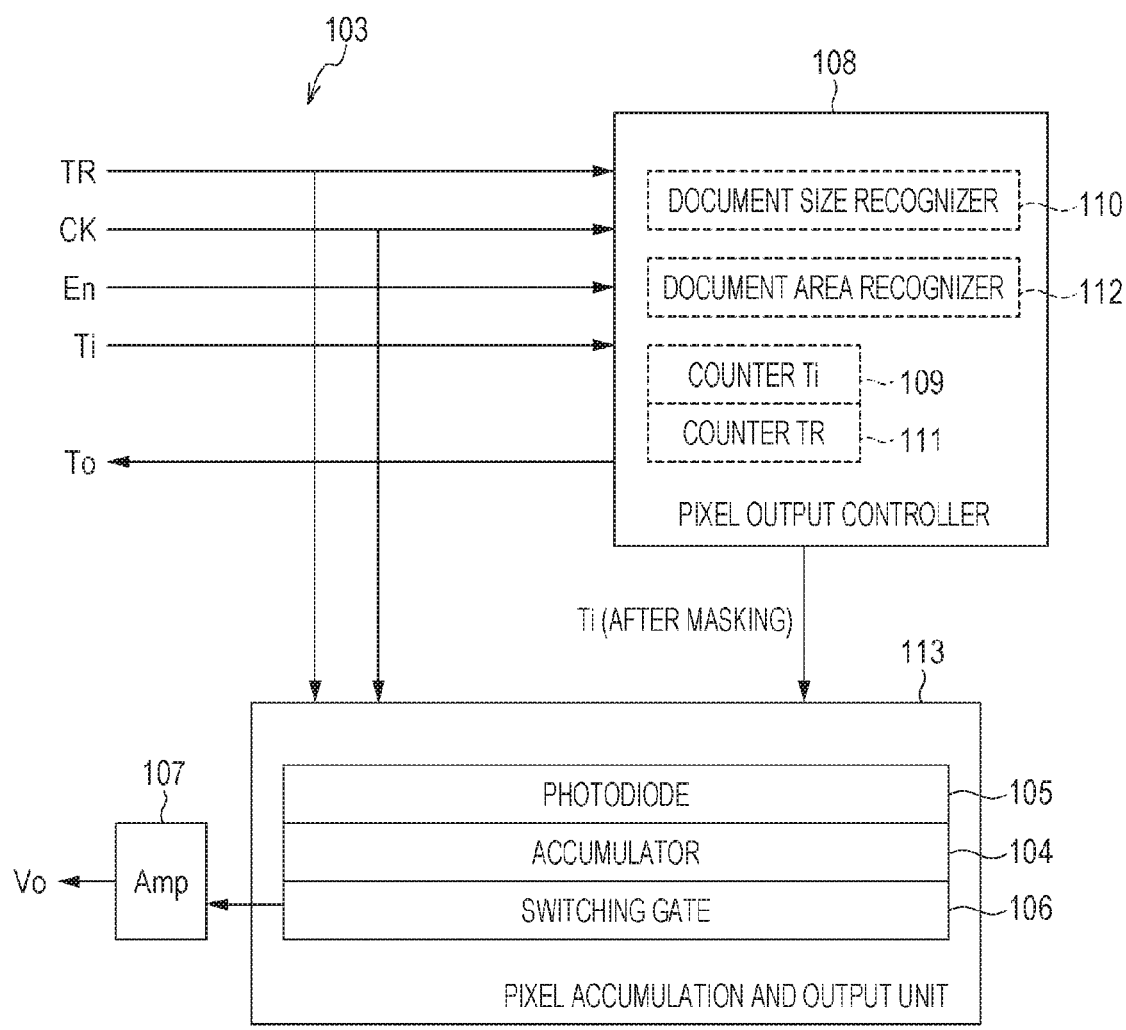
FIG. 3 is a diagram of a sensor chip according to the first embodiment.

Using FIGS. 3 and 4, the configuration and operation of each sensor chip 103 will be described. FIG. 3 is an explanatory diagram of the configuration and operation of each sensor chip 103.

As illustrated in FIG. 3, the sensor chip 103 includes a pixel accumulation and output unit 113, and is controlled by an image output controller 108.

The image output controller 108 includes a document size recognizer 110, a document area recognizer 112, a counter Ti 109 that starts counting in response to a sensor chip start pulse Ti serving as a trigger, and a counter TR 111 that starts counting in response to a line start pulse TR serving as a trigger. Note that, in FIG. 3, TR is a line start pulse, CK is a master clock, En is a document area signal, Ti is a sensor chip start pulse, and To is a sensor chip end pulse.

The document size recognizer 110 causes the sensor chip 103 to recognize (identify) the document size (document width in the embodiment) and the resolution, from the counted number of master clocks (CK) in a High section of the line start pulse (TR), that is, the pulse width of the line start pulse. For example, if the counted number is two clocks, reading is performed in the mode of A3/300 dpi; if the counted number is three clocks, reading is performed in the mode of A3/600 dpi; if the counted number is four clocks, reading is performed in the mode of A3/1200 dpi; if the counted number is five clocks, reading is performed in the mode of A4/300 dpi; if the counted number is six clocks, reading is performed in the mode of A4/600 dpi; and if the counted number is seven clocks, reading is performed in the mode of A4/1200 dpi. As a detailed operation, the counter TR 111 starts counting on the leading edge of the line start pulse (TR), and the document size and the resolution are recognized by a counted value on the trailing edge of the line start pulse (TR).

At the time the document area signal (En) is High, the document area recognizer 112 recognizes that the sensor chip 103 is within the A3 and A4 document reading areas, that is, determines that the sensor chip 103 is arranged within the A3 and A4 document reading ranges. At the time the document area signal (En) is Low, the document area recognizer 112 recognizes that the sensor chip 103 is within the A3 document reading area but is outside the A4 document reading area, that is, determines that the sensor chip 103 is arranged within the A3 document reading range but outside the A4 document reading range.

The pixel output controller 108 is configured with a logic circuit that controls through/mask of the sensor chip start pulse (Ti) on the basis of the recognized document size information and document area information. The pixel output controller 108 according to the embodiment is signal control means that controls output of a pixel signal by controlling through/mask of the sensor chip start pulse (Ti). Note that the through/mask control will be described later.

The pixel accumulation and output unit 113 includes an accumulator 104, a photodiode 105, and a switching gate 106. The photodiode 105 includes a plurality of photoelectric conversion elements arranged in a line, and converts received light to electric charge. The accumulator 104 includes a plurality of charge storage elements that are arranged in parallel with the photodiode 105 and that accumulate signal charge. The switching gate 106 holds electric charge accumulated by the accumulator 104, and sequentially transfers the held electric charge to an output circuit (Amp) 107.

The output circuit 107 converts the transferred electric charge to an electric voltage, and outputs the electric voltage to the AFE unit 21. FIG. 4 illustrates a control process flow of the sensor chip 103 according to the embodiment. The flowchart in FIG. 4 illustrates the flow of a process performed when the CPU 511 loads a control program stored in the ROM 512 to the RAM 513, and executes that program.

Firstly, when a power switch of the image reading apparatus 1 is pressed, the image reading apparatus 1 is activated (S101).

When the image reading apparatus 1 is activated, the reading mode such as the resolution, document size, and scan/copy is designated on the basis of a mode instruction given from the user using the operation unit 516, the external device 520, or the PC 518 (S102), and reading is started (S103). In response to an input of TR from the reading controller 24 (S104), the electric charge accumulated in the accumulator 104 is reset, and, in response to reception of light by the photodiode 105, accumulation into the accumulator 104 is started (S105). Simultaneously, at the time TR is input, the counter TR 111 starts counting the master clocks CK input from the reading controller 24 (S106).

It is determined whether Ti is Low (S107). In the case where Ti is Low (Yes in S107), the sensor chip 103 is not the head chip of each output line, and processing in S108 to S116 is performed. In the case where Ti is not Low (No in S107), the process proceeds to S117.

On the trailing edge of TR (S108), the document size recognizer 110 included in the pixel output controller 108 causes the sensor chip 103 to recognize the document size and the resolution, from the counted value of the counter TR 111 (S109). For example, if the counted number is two clocks, it is recognized that the mode is A3/300 dpi; if the counted number is three clocks, it is recognized that the mode is A3/600 dpi; if the counted number is four clocks, it is recognized that the mode is A3/1200 dpi; if the counted number is five clocks, it is recognized that the mode is A4/300 dpi; if the counted number is six clocks, it is recognized that the mode is A4/600 dpi; and if the counted number is seven clocks, it is recognized that the mode is A4/1200 dpi. Then, the process proceeds to S110.

In S110, To output at the time pixel output performed by a sensor chip 103 that precedes the sensor chip 103 ends is input as Ti to the pixel output controller 108 of the sensor chip 103. At this time, it is determined whether the sensor chip 103 is within the reading areas (S110). In the case where the document area signal En is High, the document area recognizer 112 recognizes that the sensor chip 103 is within the A3 and A4 reading areas. In contrast, in the case where the document area signal En is Low, the document area recognizer 112 recognizes that the sensor chip 103 is within the A3 document reading area but is outside the A4 document reading area.

In the case where the pixel output controller 100 determines that the sensor chip 103 is within the reading areas (Yes in S110), Ti passes through the pixel output controller 108 and is input to the pixel accumulation and output unit 113 (S111), the counter Ti starts counting the master clocks CK input from the reading controller 24 (S112), and also pixel output is started (S113). When counting equivalent to one sensor chip ends (S114), pixel output also ends. Thus, the pixel output controller 108 outputs To (S115).

In the case where it is determined that the sensor chip 103 is outside the reading areas (No in S110), Ti is masked at the pixel output controller 108 (S116), and Ti is not input to the pixel accumulation and output control unit 113. Thus, pixel output is masked.

In the case where Ti is High (No in S107), the sensor chip 103 is the head chip of each output line (since the head chip pulls up a Ti terminal by using VDD in the first to fourth embodiments), processing in S117 to S122 is performed. Firstly, the counter Ti 111 starts counting the master clocks CK (S117), and pixel output is started (S118). On the trailing edge of TR (S119), the document size recognizer 110 included in the pixel output controller 108 causes the sensor chip 103 to recognize the document size and the resolution, from the counted value of the counter TR 111 (S120). Thereafter, when counting equivalent to one sensor chip ends (S114), pixel output also ends. Thus, the pixel output controller 108 outputs To (S115). FIG. 4 includes timing charts of sensor chips 103. FIG. 4(a) is a timing chart of a sensor chip 103 output at first in each output line, and FIG. 4(b) is a timing chart of a sensor chip 103 output second in each output line. Note that it is assumed that the document size is A3 and the resolution is 600 dpi in the timing charts.

Firstly, the reading controller 24 inputs the line start pulse (TR) to all sensor chips 103 included in the CIS 100. The line start pulse TR is input to every line to be read. On the leading edge of the line start pulse TR, each of all the sensor chips 103 in the CIS 100 transfers electric charge of the preceding line, accumulated in the accumulator 104, to the switching gate 106 to reset the accumulator 104, thereby starting light reception by the photodiode 105 and electric charge accumulation in the accumulator 104 (t10). Note that electric charge accumulation is done until the line start pulse TR of the next line is input (t14).

In response to the sensor chip start pulse Ti serving as a trigger, each of the sensor chips 103 sequentially transfers pixels of the preceding line, held in the switching gate 106, to the output circuit 107. Since the head sensor chip in FIG. 5(a) clamps Ti to be High, pixel output starts on the leading edge of TR (t10). Simultaneously, the counter Ti 109 starts counting pixels (t10), and when the counted value becomes a count equivalent to the number of pixels of the sensor chip 103, the pixel output controller 108 outputs the sensor chip end pulse To (t12). Here, the pixel counting is performed in synchronization with the master clocks CK input from the reading controller 24. In the embodiment, in the case of 600 dpi, the sensor chip end pulse To is output when the counter Ti 109 counts a count of 439.

Figure 5:
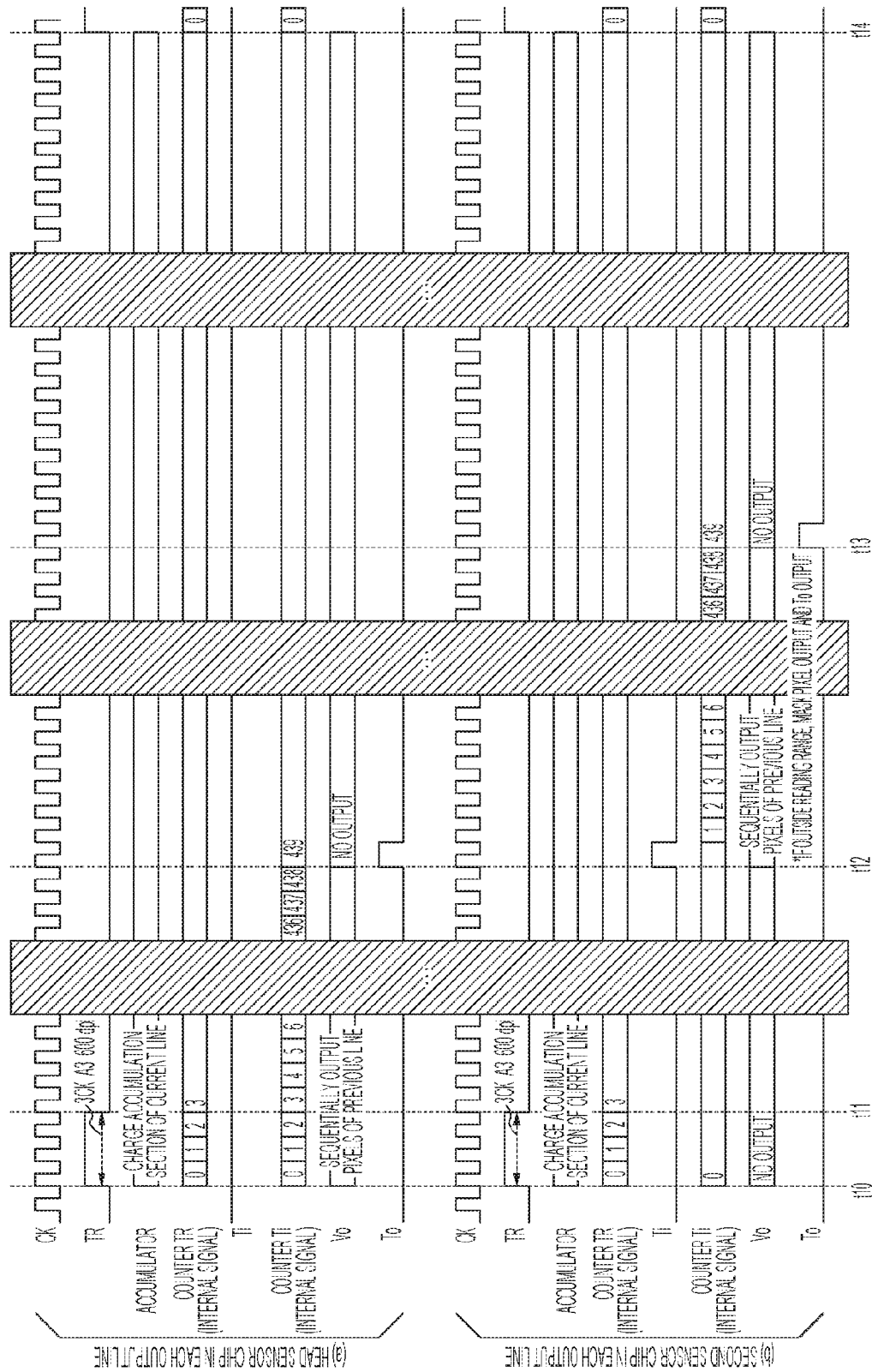
FIG. 5 includes timing charts of sensor chips according to the first embodiment.

At this time, because To of the sensor chip 103 in FIG. 5(a) and Ti of the sensor chip 103 in FIG. 5(b) are electrically connected, Ti is input to the sensor chip in FIG. 5(b), and the counter Ti 109 starts counting (t12). When the count Ti 109 counts a count equivalent to the number of pixels of the sensor chip 103 (439 in the case of 600 dpi), the pixel output controller 108 outputs the sensor chip end pulse To (t13). The third sensor chip 103 and so forth sequentially perform the same or similar processing, and, after all the sensor chips 103 output pixels, TR from the reading controller 24 is input to the sensor chips 103, and the same or similar processing starts on the next line (t14).

In the sensor chips 103 according to the embodiment, the pixel output controller 108 has a logic circuit configuration that performs control for allowing Ti to pass through the image accumulation output unit 111 or masking Ti at the image accumulation output unit 111 at the time Ti is input (t12), and whether to output the pixels in the switching gate 106 is determined on the basis of through/mask of Ti.

As has been described above, in S110, the pixel output controller 108 determines whether the sensor chip is within or outside the reading areas, on the basis of document size information recognized by the document size recognizer 110 and document area information recognized by the document area recognizer 112. In accordance with the determination result, the pixel output controller 108 masks Ti or allows Ti to pass through.

Using FIG. 6, through/mask control of Ti will be specifically described. In the case where the document size recognizer 110 recognizes an A3 document, regardless of the value of the document area signal (En), Ti passes through the image output controller 108 and is input to the pixel accumulation output unit 111, and a pixel signal is output. In contrast, in the case where the document size recognizer 109 recognizes an A4 document, if the document area signal (En) is High (En=1 in the diagram), the document area recognizer 110 recognizes that the sensor chip 103 is within the A3 and A4 document reading areas, Ti passes through the image output controller 108 and is input to the pixel accumulation output unit, and a pixel signal is output. If the document area signal (En) is Low (En-0 in the diagram), the document area recognizer 110 recognizes that the sensor chip 103 is within the A3 document reading area but is outside the A4 document reading area, Ti is masked by the image output controller 108 and is not input to the pixel accumulation output unit, and hence no pixel signal is output.

FIG. 7 is a diagram of an A3-width CIS using sensor chips 103. Here, only the arrangement and connections of the sensor chips 103 are described, and the descriptions of the LED 102 and the light guide 101 are omitted. In the embodiment, the CIS 100 has seventeen sensor chips 103 that are arranged in a main scanning direction, and the effective reading area of each sensor chip 103 is 18.5625 mm. The seventeen sensor chips 103 will be denoted as chip 0 to chip 16 from the left. The line start pulse (TR) is input to a TR terminal of each sensor chip 103, and the master clock (CK) is input to a CK terminal of each sensor chip 103. In this manner, the CIS 100 has a plurality of sensor chips 103 arranged in a certain direction.

The CIS 100 has four output lines (output channels) Vout 0 to Vout 3, and pixel signals are output in parallel to the AFE unit 21. In order that pixel signals can be output from Vout 0 in the order of chip 0, chip 4, chip 8, chip 12, and chip 16, To of each sensor chip 103 is connected to Ti of the next chip, and Vo of these sensor chips 103 are connected to Vout 0. In order that pixel signals can be output from Vout 1 in the order of chip 1, chip 5, chip 9, and chip 13, To of each sensor chip 103 is connected to Ti of the next chip, and Vo of these sensor chips 103 are connected to Vout 1. In order that pixel signals can be output from Vout 2 in the order of chip 2, chip 6, chip 10, and chip 14, To of each sensor chip 103 is connected to Ti of the next chip, and Vo of these sensor chips 103 are connected to Vout 2. In order that pixel signals can be output from Vout 3 in the order of chip 3, chip 7, chip 11, and chip 15, To of each sensor chip 103 is connected to Ti of the next chip, and Vo of these sensor chips 103 are connected to Vout 3. VDD is connected to Ti of chip 0, chip 1, chip 2, and chip 3 that first output pixel signals in the respective output lines.

In this manner, in the CIS 100, every certain number of a plurality of sensor chips 103 included in a sensor chip group are connected to a corresponding one of the output channels. In other words, a plurality of sensor chips 103 are divided into a plurality of groups in a direction where the sensor chips are arranged (parallel direction), and the sensor chips included in each group are connected to different output channels.

More specifically, the sensor chips 103 at an interval of the number of output channels are connected to one output channel. For example, since there are four output channels in the embodiment, every four sensor chips 103 are connected to one output channel.

VDD is connected in order to cause the document area signal (En) of chip 0 to chip 11 that are within the A3 and A4 reading areas to be High, and GND is connected in order to cause the document area signal (En) of chip 12 to chip 16 that are within the A3 document reading area but are outside the A4 document reading area to be Low. Note that the document area signal (En) may be controlled from the signal processing unit 20.

Figure 8A:
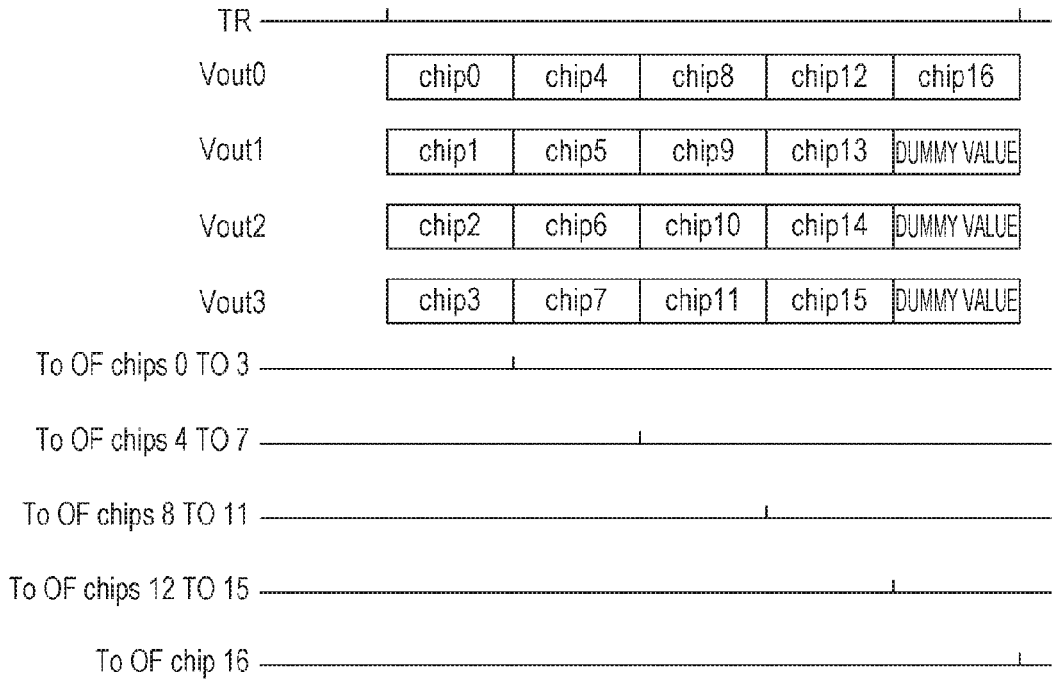
FIGS. 8A and 8B are diagrams illustrating CIS outputs at the time of reading according to the first embodiment.

FIG. 8A illustrates outputs of the CIS 100 in the case where the image reading apparatus according to the first embodiment reads an A3 document at 600 dpi. Firstly, the line start pulse (TR) is input. By inputting the line start pulse (TR) for a pulse length equivalent to six clocks, the document size recognizer 110 of each sensor chip 103 recognizes an A3 document and a resolution of 600 dpi. In response to an input of the line start pulse (TR), chip 0, chip 1, chip 2, and chip 3 whose Ti are fixed at High start outputting pixel signals. When chip 0, chip 1, chip 2, and chip 3 end outputting pixel signals, To of chip 0, chip 1, chip 2, and chip 3 are input to Ti of chip 4, chip 5, chip 6, and chip 7, respectively, and chip 4, chip 5, chip 6, and chip 7 start outputting pixel signals. When chip 1, chip 5, chip 6, and chip 7 end outputting pixel signals, To of chip 4, chip 5, chip 6, and chip 7 are input to Ti of chip 8, chip 9, chip 10, and chip 11, respectively, and chip 8, chip 9, chip 10, and chip 11 start outputting pixel signals. When chip 8, chip 9, chip 10, and chip 11 end outputting pixel signals, To of chip 8, chip 9, chip 10, and chip 11 are input to Ti of chip 12, chip 13, chip 11, and chip 15, respectively, and chip 12, chip 13, chip 14, and chip 15 start outputting pixel signals. When chip 12, chip 13, chip 14, and chip 15 end outputting pixel signals, To of chip 15 is input to Ti of chip 16, and chip 16 starts outputting a pixel signal. While chip 16 is outputting a pixel signal from Vout 0, Vout 1, Vout 2, and Vout 3 output dummy values. When chip 16 ends outputting a pixel signal and receives the line start pulse (TR), the next line starts pixel output.

Figure 8B:
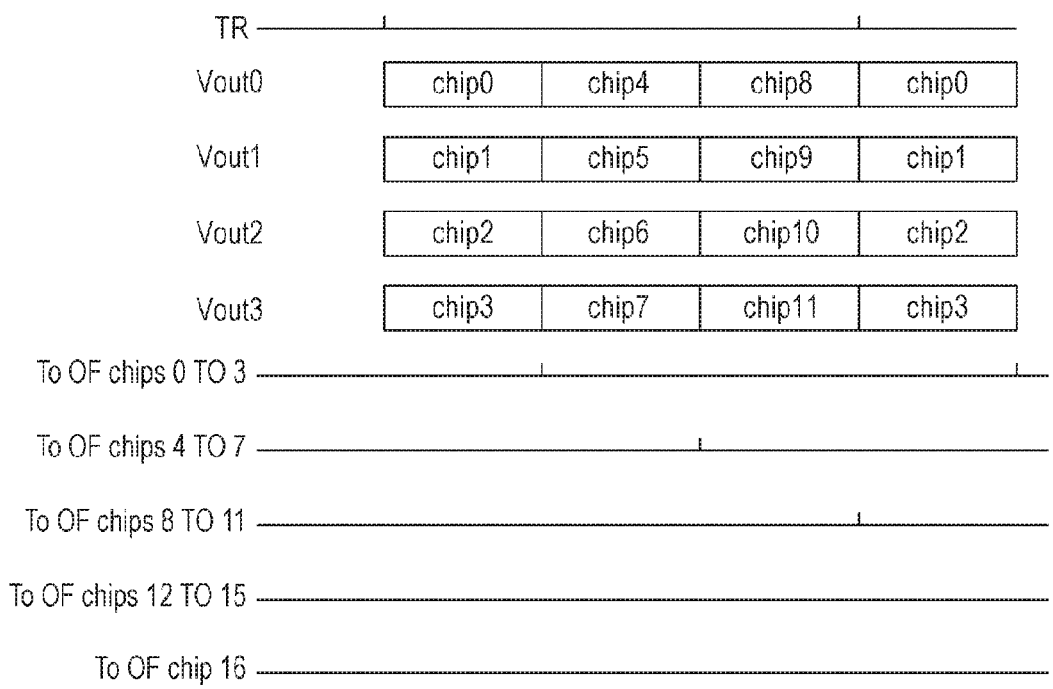

FIG. 8B illustrates outputs of the CIS 100 in the case where the image reading apparatus according to the first embodiment reads an A4 document at 600 dpi. Firstly, the line start pulse (TR) is input. By inputting the line start pulse (TR) for a pulse length equivalent, to three clocks, the document size recognizer 110 of each sensor chip 103 recognizes an A4 document and a resolution of 600 dpi. In response to an input of the line start pulse (TR), chip 0, chip 1, chip 2, and chip 3 whose Ti are fixed at High start outputting pixel signals. When chip 0, chip 1, chip 2, and chip 3 end outputting pixel signals, To of chip 0, chip 1, chip 2, and chip 3 are input to Ti of chip 4, chip 5, chip 6, and chip 7, respectively, and chip 4, chip 5, chip 6, and chip 7 start outputting pixel signals. When chip 4, chip 5, chip 6, and chip 7 end outputting pixel signals, To of chip 4, chip 5, chip 6, and chip 7 are input to Ti of chip 8, chip 9, chip 10, and chip 11, respectively, and chip 8, chip 9, chip 10, and chip 11 start outputting pixel signals. When chip 8, chip 9, chip 10, and chip 11 end outputting pixel signals, To of chip 8, chip 9, chip 10, and chip 11 are input to Ti of chip 12, chip 13, chip 14, and chip 15, respectively. However, these Ti are masked by the image output controllers 108 of the sensor chips 103. As a result, chip 12, chip 13, chip 14, and chip 15 do not output pixel signals. Therefore, when chip 8, chip 9, chip 10, and chip 11 end outputting pixel signals, if the line start pulse (TR) is input, chip 0, chip 1, chip 2, and chip 3 of the next line can output pixel signals, without colliding with outputs of chip 12, chip 13, chip 14, and chip 15. Accordingly, the line time of reading an A4 document can be made shorter than that of reading an A3 document.

In the embodiment, as has been described above, pixel signals can be output only from sensor chips required for reading a document by suppressing pixel signal output of sensor chips corresponding to a portion outside the range of a document width and changing the interval between line start pulses (TR) to be shortened. Since output of pixel signals of sensor chips that are outside a reading area is masked in the embodiment, the next line outputs pixel signals without colliding with the foregoing pixel signals.

In the embodiment, by discretely connecting the sensor chips 103 in each output channel, the sensor chips 103 outside the reading range can perform output at the end of the line. By preventing these sensor chips 103 outside the reading range from outputting pixels, in the case of reading a document that is narrower than the readable size of the CIS 100, the reading time per line can be made shorter than that of a known configuration. Therefore, in the case of reading a document that is narrower than the readable size of the CIS 100, the overall document reading speed can also be improved, compared with the case of reading a document that has the maximum readable size of the CIS 100.

From the above, even when the configuration has wide sensor chips (such as A3-width sensor chips), the reading speed can be made faster in the case of reading a narrow document (such as an A4-width document). That is, this configuration can realize a reading speed equivalent to that of a reading apparatus with sensor chips having substantially the same width as the document width.

Second Embodiment

Using FIGS. 9 to 12, a second embodiment will be described. Since the second embodiment is the same as the first embodiment except for the configuration of the pixel output controller of each sensor chip, descriptions that overlap the first embodiment will be omitted. In addition, the same components as those in the first embodiment will be given the same references.

Figure 9:
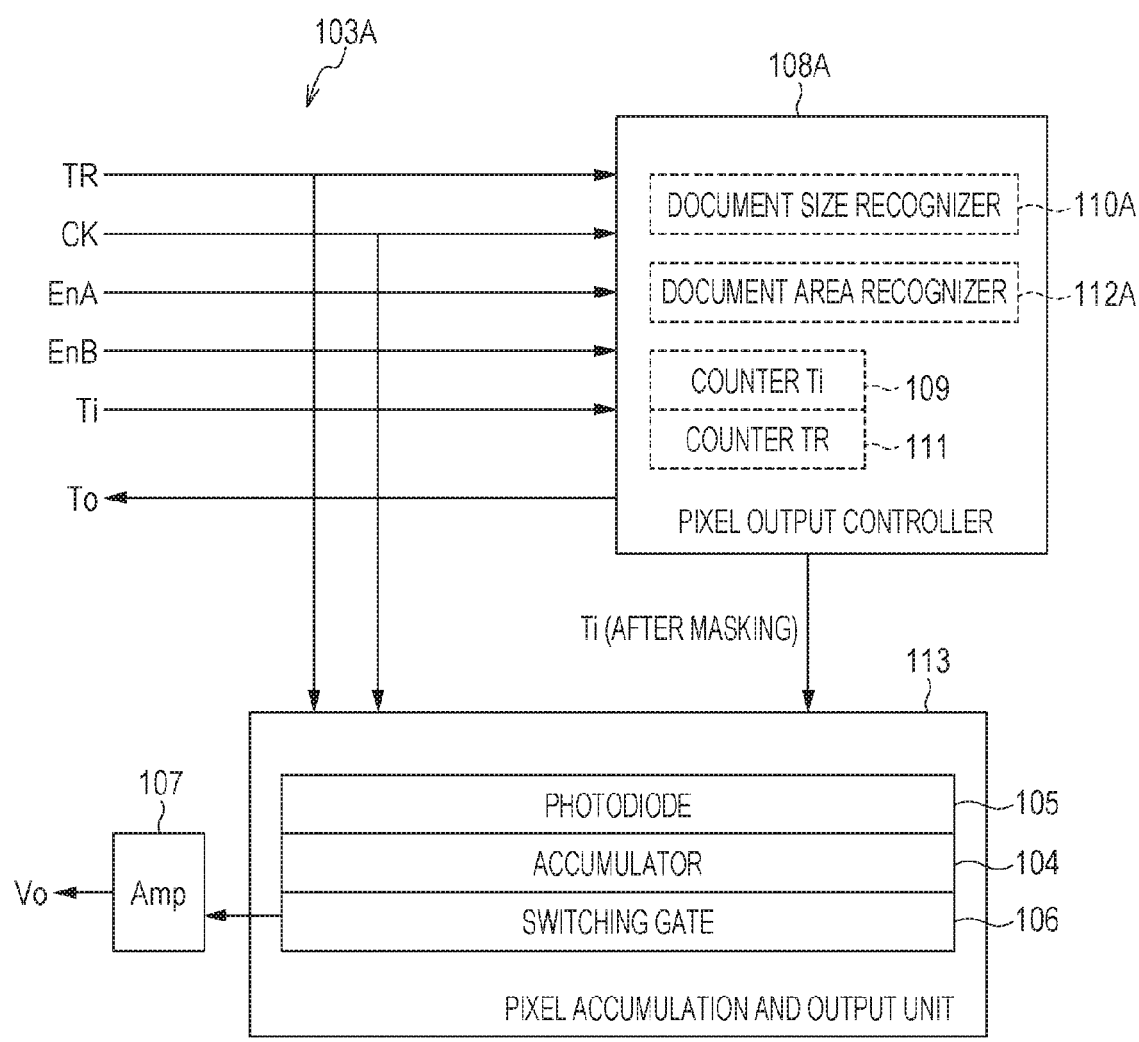
FIG. 9 is a diagram of a sensor chip according to a second embodiment.

FIG. 9 is a diagram illustrating the configuration of each sensor chip 103A. The sensor chip 103A includes a pixel output controller 108A and the pixel accumulation and output unit 113. Since the pixel accumulation and output unit 113 has the same configuration as that of the first embodiment, a description thereof is omitted.

The pixel output controller 1082 includes a document size recognizer 110A, a document area recognizer 112A, the counter Ti 109 which counts sensor chip start pulses, and the counter TR 111 which counts line start pulses TR.

Like the first embodiment, the document size recognizer 110A causes the sensor chip 103 to recognize the document size and the resolution, from the counted number of master clocks (CK) in a High section of the line start pulse (TR). In the embodiment, unlike the first embodiment, the document size A5 can further be recognized. For example, if the counted number is two clocks, the mode is A3/600 dpi; if the counted number is three clocks, the mode is A3/600 dpi; if the counted number is four clocks, the mode is A3/1200 dpi; if the counted number is five clocks, the mode is A4/300 dpi; if the counted number is six clocks, the mode is A4/600 dpi; and if the counted number is seven clocks, the mode is A4/1200 dpi. Furthermore, if the counted number is eight clocks, the mode is A5/300 dpi; if the counted number is nine clocks, the mode is A5/600 dpi; and if the counted number is ten clocks, the mode is A5/1200 dpi.

In order to increase the number of cases of area recognition greater than that in the first embodiment, the document area recognizer 112A increases the document area signal to two lines (EnA, EnB). For example, if the document area signals (EnA, EnB) are (High, High), the sensor chip 103A recognizes that the sensor chip 103A is within A3, A4, and A5 reading areas. In the case where the document area signals (EnA, EnB) are (High, Low), the sensor chip 103A recognizes that the sensor chip 103A is within the A3 document reading area and the A4 document reading area but is outside the A5 document reading area. In the case where the document area signals (EnA, EnB) are (Low, Low), the sensor chip 103A recognizes that the sensor chip 103A is within the A3 document reading area but is outside the A4 document reading area and the A5 document reading area. Although the case where the document area signals (EnA, EnB) are (Low, High) is regarded as being outside a setting target, the embodiment has a configuration in which, in the case of a setting error, Ti and pixel output are masked. Like the first embodiment, the pixel output controller 108 is configured with a logic circuit that controls through/mask of Ti on the basis of the recognized document size information and document area information.

FIG. 10 is an explanatory diagram of Ti through/mask control according to the embodiment.

In the case where the document size recognizer 110A recognizes an A3 document, the chip start pulse (Ti) passes through the image output controller 108A and is input to the pixel accumulation and output unit 113 except for the case where the document area signals (EnA, EnB) are (Low, High), and accordingly, a pixel signal is output.

In the case where the document size recognizer 110A recognizes an A4 document and the document area signals (EnA, EnB) are (High, High), the document area recognizer 112A recognizes that the sensor chip 103A is within the A3, A4, and A5 reading areas. In this case, the chip start pulse (Ti) passes through the image output controller 108A and is input to the pixel accumulation and output unit 113, and accordingly, a pixel signal is output. In the case where the document area signals (EnA, EnB) are (High, Low), the document area recognizer 112A recognizes that the sensor chip 103A is within the A3 and A4 document reading areas but is outside the A5 document reading area. In this case, the chip start pulse (Ti) passes through the image output controller 108A and is input to the pixel accumulation and output unit 113, and accordingly, a pixel signal is output. In the case where the document area signals (EnA, EnB) are (Low, Low), the document area recognizer 1122 recognizes that the sensor chip 103A is within the A3 document reading area but is outside the A4 and A5 document reading areas. In this case, the chip start pulse (Ti) is masked by the image output controller 108A and is not input to the pixel accumulation and output unit 113, and accordingly, no pixel signal is output.

In the case where the document size recognizer 110A recognizes an A5 document and the document area signals (EnA, EnB) are (High, High), the document area recognizer 112A recognizes that the sensor chip 103A is within the A3, A4, and A5 reading areas. In this case, the chip start pulse (Ti) passes through the image output controller 108A and is input to the pixel accumulation and output unit 113, and accordingly, a pixel signal is output. In the case where the document area signals (EnA, EnB) are (High, Low), the document area recognizer 112A recognizes that the sensor chip 103A is within the A3 and A4 document reading areas but is outside the A5 document reading area. In this case, the chip start pulse (Ti) is masked by the image output controller 108A and is not input to the pixel accumulation and output unit 113, and accordingly, no pixel signal is output. In the case where the document area signals (EnA, EnB) are (Low, Low), the document area recognizer 112A recognizes that the sensor chip 103A is within the A3 document reading area but is outside the A4 and A5 document reading areas. In this case, the chip start pulse (Ti) is masked by the image output controller 108A and is not input to the pixel accumulation and output unit 113, and accordingly, no pixel signal is output.

Figure 11:
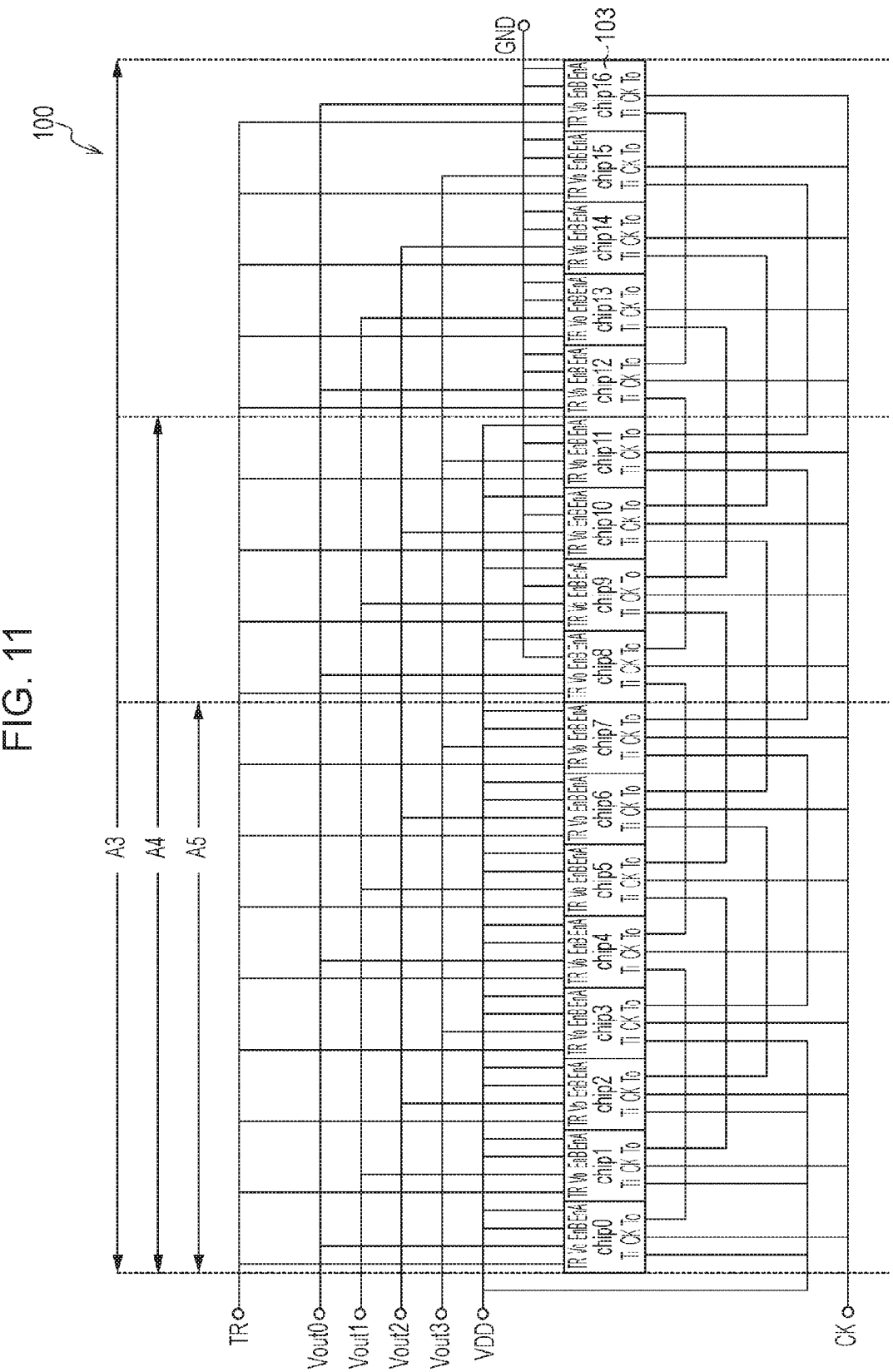
FIG. 11 is a diagram of a CIS according to the second embodiment.

FIG. 11 is a diagram illustrating an A3-width CIS configuration using sensor chips 103A illustrated in FIG. 9. Since connections except for the document area signals EnA and EnB are the same as those in FIG. 7, descriptions thereof are omitted. VDD is connected in order to cause the document area signals (EnA, EnB) of chip 0 to chip 7 that are within the A3, A4, and A5 reading areas to be (High, High), and (VDD, GND) are connected in order to cause the document area signals (EnA, EnB) of chip 8 to chip 11 that are within the A3 document reading area and the A4 document reading area but are outside the A5 document reading area to be (High, Low). GND is connected in order to cause the document area signals (EnA, EnB) of chip 12 to chip 16 that are within the A3 document reading area but are outside the A4 document reading area and the A5 document reading area to be (Low, Low). Note that the document area signals EnA, EnB may be controlled from the signal processing unit 20. In addition, the document area signals EnA, EnB may serve as one terminal. Although three document areas can be recognized in the embodiment by applying two voltages High and Low as logic voltages to EnA and EnB, the configuration is not limited thereto. For example, when EnA and EnB terminals are made common (a common terminal may be En) and an input buffer that identifies three levels of input 3.3 V, 1.6 V, and 0 V is provided, three document areas can be recognized by controlling an input voltage of En of each chip.

CIS outputs in the case of reading an A3 document at 600 dpi in the embodiment are the same as CIS outputs in the case of A3 reading in the first embodiment illustrated in FIG. 8A. CIS outputs in the case of reading an A4 document at 600 dpi in the embodiment are the same as CIS outputs in the case of A3 reading in the first embodiment illustrated in FIG. 8B. Therefore, descriptions of these CIS outputs are omitted.

Figure 12:
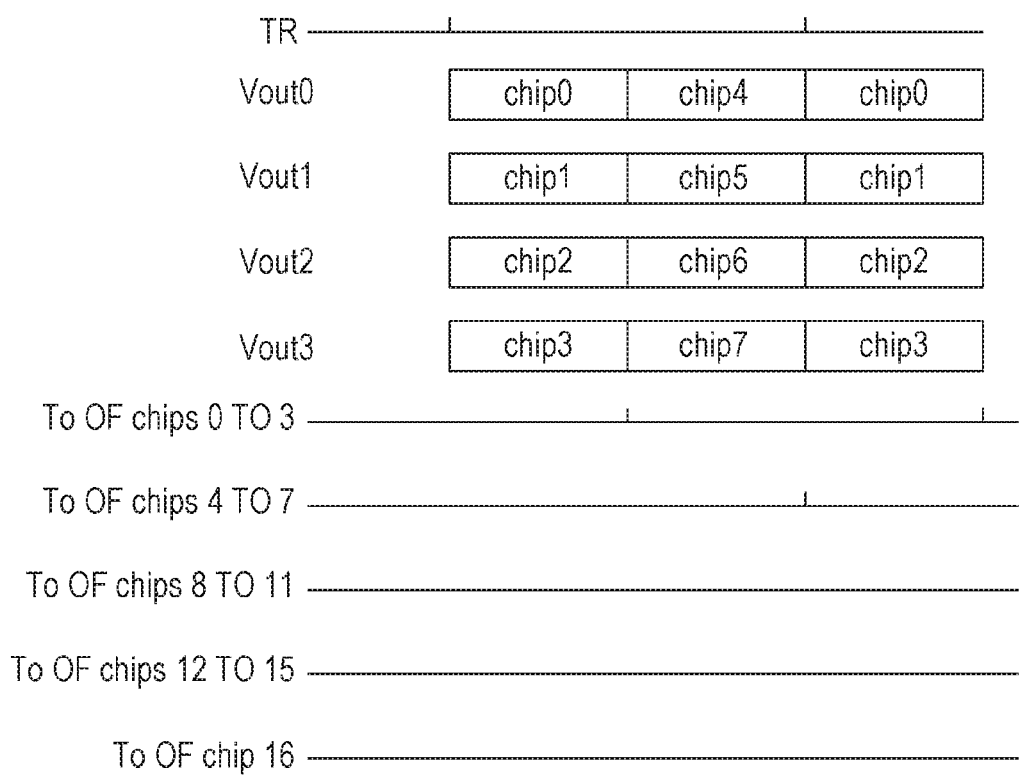
FIG. 12 is a CIS output diagram at the time of reading an A5 document according to the second embodiment.
Figure 13:
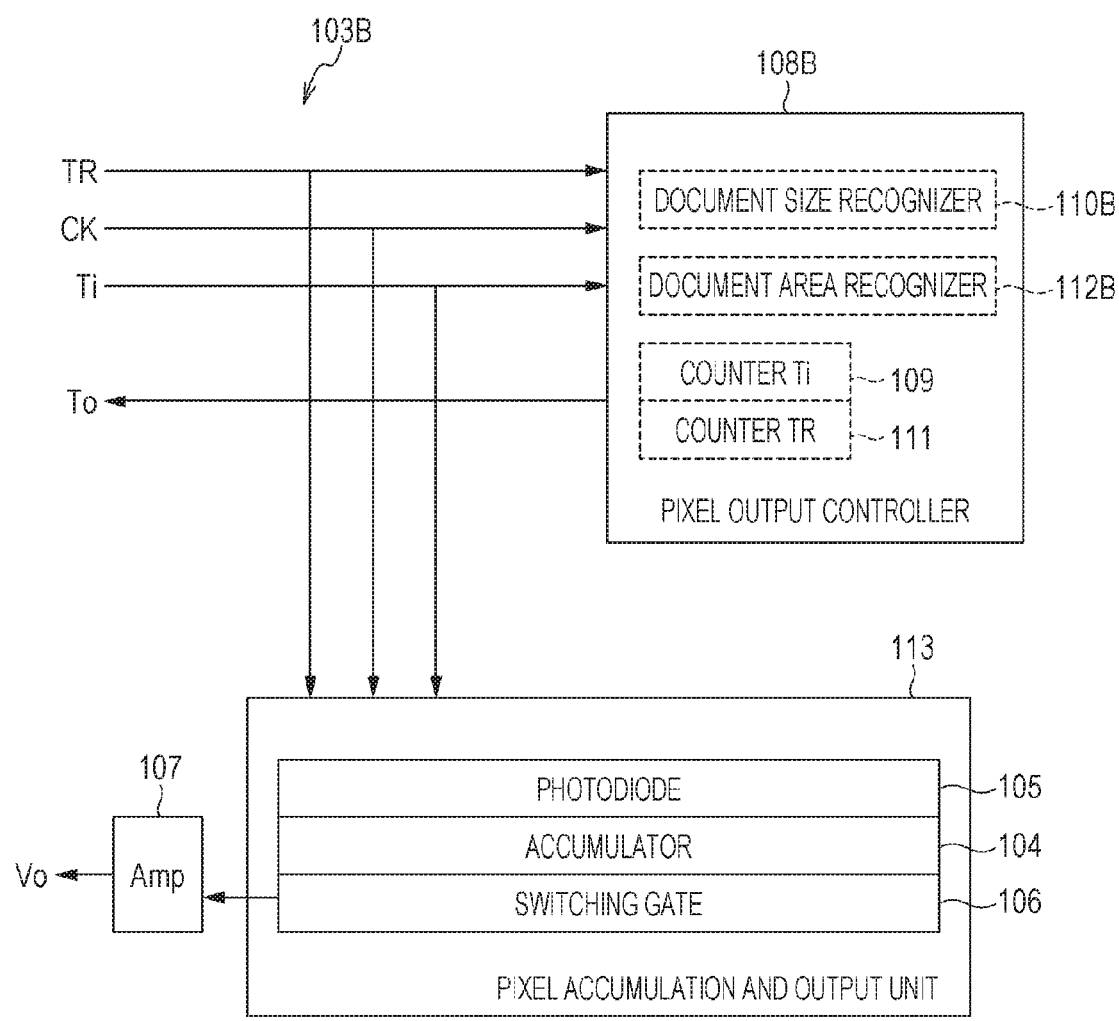
FIG. 13 is a diagram of a sensor chip according to a third embodiment.

FIG. 12 illustrates CIS outputs in the case of reading an A5 document at 600 dpi. Firstly, the line start pulse (TR) is input. By inputting the line start pulse (TR) for a pulse length equivalent to nine clocks, the document size recognizer 110A of each sensor chip 103A recognizes an A5 document and a resolution of 600 dpi. In response to an input of the line start pulse (TR), chip 0, chip 1, chip 2, and chip 3 whose Ti are fixed at High start outputting pixel signals. When chip 0, chip 1, chip 2, and chip 3 end outputting pixel signals, To of chip 0, chip 1, chip 2, and chip 3 are input to Ti of chip 4, chip 5, chip 6, and chip 7, respectively, and chip 4, chip 5, chip 6, and chip 7 start outputting pixel signals. When chip 4, chip 5, chip 6, and chip 7 end outputting pixel signals, To of chip 4, chip 5, chip 6, and chip 7 are input to Ti of chip 8, chip 9, chip 10, and chip 11, respectively, but Ti is masked by the image output controller 108 of each sensor chip 103A. As a result, chip 8, chip 9, chip 10, and chip 11 do not output pixel signals. Therefore, when chip 8, chip 9, chip 10, and chip 11 end outputting pixel signals, if the line start pulse (TR) is input, chip 0, chip 1, chip 2, and chip 3 of the next line can output pixel signals, without colliding with outputs of chip 8, chip 9, chip 10, and chip 11. Thus, the line time can be made shorter than that of reading an A4 document.

As has been described above, the greater the number of lines of En, the more the types of documents can be recognized, and the faster the reading speed becomes. Although the number of lines of En is two in the embodiment, the number is not limited thereto.

From the above, even when the configuration has wide sensor chips (such as A3-width sensor chips), the reading speed can be made faster in the case of reading a narrow document (such as an A4-width document or an A5-width document). That is, this configuration can realize a reading speed equivalent to that of a reading apparatus with sensor chips having substantially the same width as the document width.

Third Embodiment

Using FIGS. 13 to 18, a third embodiment will be described. Since the third embodiment is the same as the first embodiment except for the configuration of the pixel output controller of each sensor chip, descriptions that overlap the first embodiment, will be omitted. In addition, the same components as those in the first embodiment will be given the same references.

Figure 14:
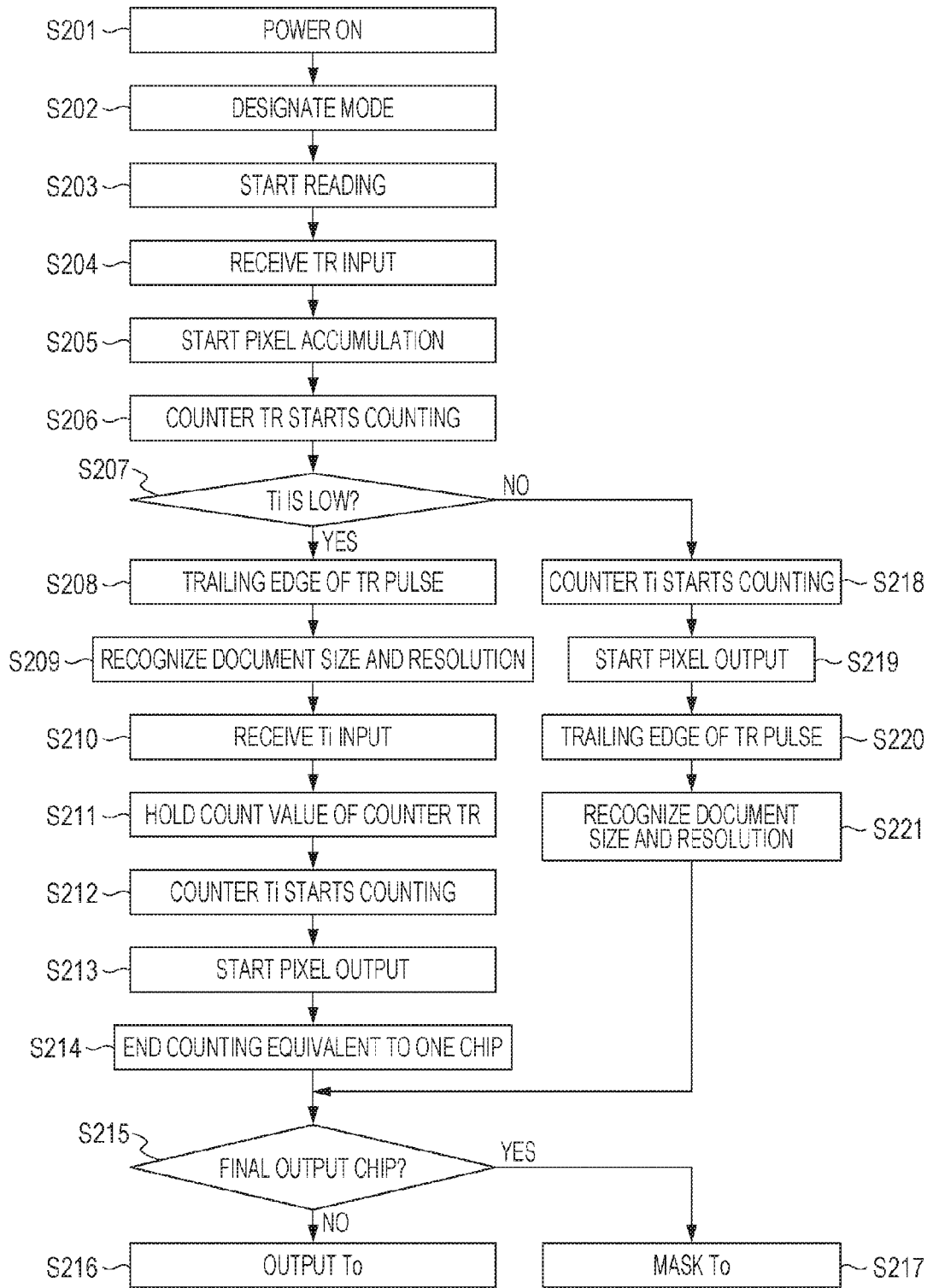
FIG. 14 is a flowchart of a process of the sensor chip according to the third embodiment.

FIG. 14 is a diagram illustrating the configuration of each sensor chip 103B. The third embodiment is the same as the first embodiment except for a pixel output controller 108B.

The sensor chip 103B includes the pixel output controller 108B and the pixel accumulation and output unit 113. Since the pixel accumulation and output unit 113 has the same configuration as that of the first embodiment, a description thereof is omitted.

The pixel output controller 108B includes a document size recognizer 110B, a document area recognizer 112B, the counter Ti 109 which counts sensor chip start pulses, and the counter TR 111 which counts line start pulses TR.

Since the operation of the head sensor chip 103B in the embodiment is the same as that in the first embodiment, a description thereof is omitted. In the operation of the second sensor chip 103B and onward, the point different from the first embodiment is that Ti is not masked, but To is masked.

The pixel output controller 108B according to the embodiment includes the document size recognizer 110B and the document area recognizer 112B, and is configured with a logic circuit that controls through/mask of To on the basis of the obtained document size information and document area information. The pixel output controller 108 according to the embodiment is signal control means that controls output of a pixel signal by controlling through/mask of To.

Like the first embodiment, the document size recognizer 110B causes the sensor chip 103B to recognize the document size and the resolution, from the counted number of master clocks (CK) in a High section of TR. The counted numbers corresponding to the respective document sizes and resolutions are the same as those in the first embodiment.

A document area recognizing method of the document area recognizer 112B is not based on the document area signal (En), as in the first embodiment. Specifically, the number of pixels from when the line start pulse (TR) is input to when the start pulse (Ti) is input is counted, and whether the sensor chip 103B is the final output chip in a reading area is determined on the basis of the counted value. The counted value is the number of pixels equivalent to two chips. This is because the number of chips involved in A4 reading is three chips in each output line (see FIG. 20A described later), and is equivalent to a time point at which Ti is input to the third sensor chip.

FIG. 14 illustrates a control process flow of the sensor chip 103B according to the embodiment. The flowchart in FIG. 14 illustrates the flow of a process performed when the CPU 511 loads a control program stored in the ROM 512 to the RAM 513, and executes that program.

Figure 4:
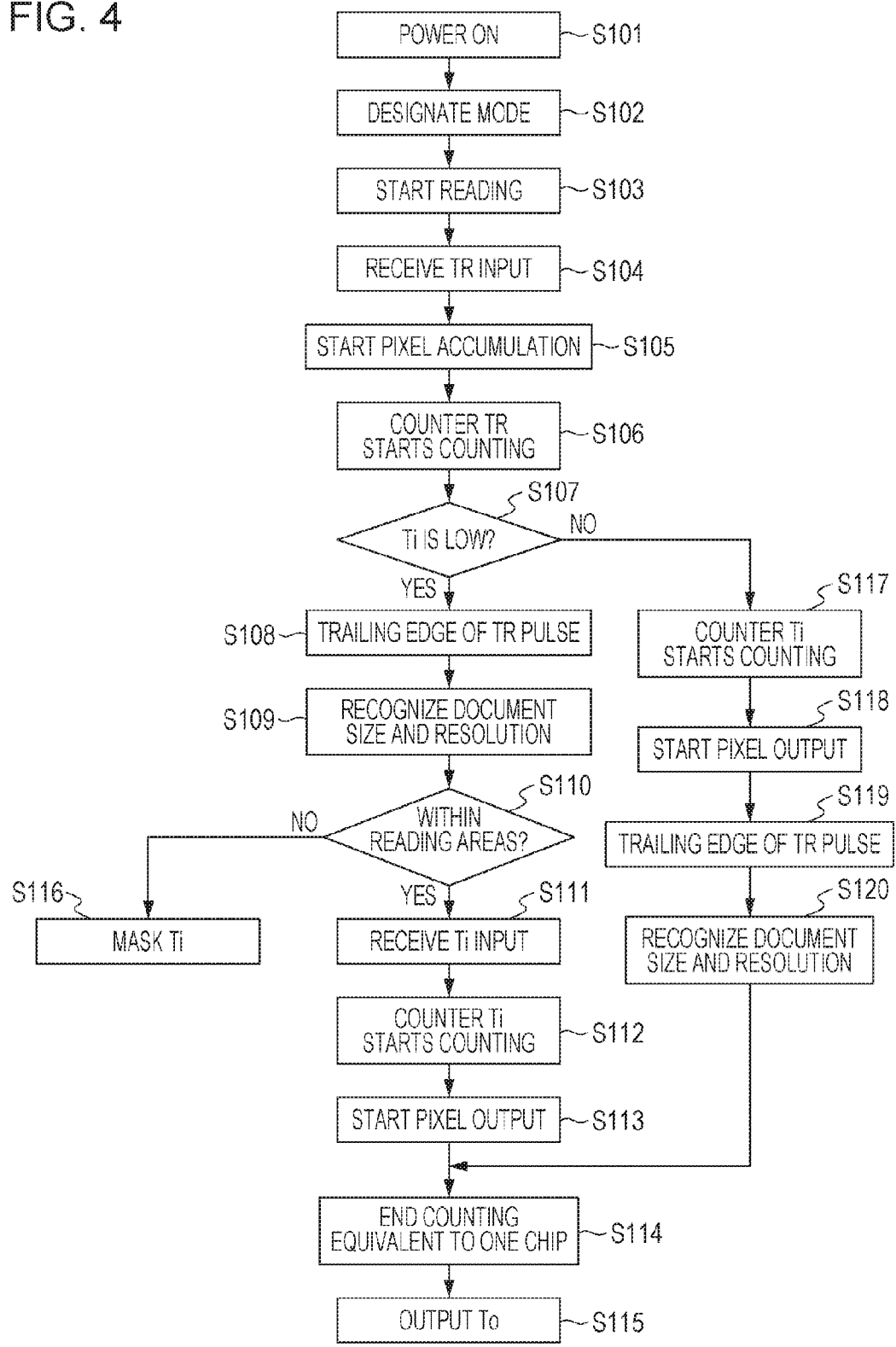
FIG. 4 is a flowchart of a process of the sensor chip according to the first embodiment.

Since S201 to S209 are the same as S101 to S109 in FIG. 4, descriptions thereof are omitted. In addition, since S218 to 221 are the same as S117 to 120 in FIG. 4, descriptions thereof are omitted.

Ti passes through the image output controller 108B and is input to the pixel accumulation and output unit 113 (S210). In the embodiment, unlike the first and second embodiments, Ti is not masked by the pixel output controller 108. In response to an input of Ti, the value of the counter TR 111 at that time is held in a flip-flop or an internal memory (S211).

Since S212 to S214 are the same as S112 and S114, descriptions thereof are omitted. When counting equivalent to one sensor chip ends (S214), it is determined whether the sensor chip is the final output chip (S215). In the case where the sensor chip is the final output chip (Yes in S215), To is output; and, in the case where the sensor chip is not the final output chip (No in S215), To is masked. That is, the pixel output controller 108B controls outputting/masking of To on the basis of the document area information recognized by the document area recognizer 112B and the document size information recognized by the document size recognizer 110B in accordance with the counted value of the counter Ti 109, held in S211. For example, in the case where the document size information recognized by the document size recognizer 110B is A4 and in the case of 300 dpi, if the counted number of master clocks (CK) from when TR is input to when Ti is input is 440, the document area recognizer 112B recognizes that the sensor chip is the final output chip of an A4 document. In the case where the document size information recognized by the document size recognizer 110B is A4 and in the case of 600 dpi, if the counted number is 878, the document area recognizer 112B recognizes that the sensor chip is the final output chip of an A4 document. In the case where the document size information recognized by the document size recognizer 110B is A4 and in the case of 1200 dpi, if the counted number is 1754 (the number of pixels equivalent to two chips at each resolution), the document area recognizer 112B recognizes that the sensor chip is the final output chip of an A4 document. In this manner, when the document area recognizer 12 recognizes that the sensor chip is the final output chip among the sensor chips 103 connected to the respective output lines Vout 0, Vout 1, Vout 2, and Vout 3, the image output controller 1085 masks To output of that sensor chip (S217). If the counted number does not fall under the above-described counted numbers, To is output (S216). In addition, in the case where the document size is A3, To is output, regardless of the counted number (S216).

Figure 15:
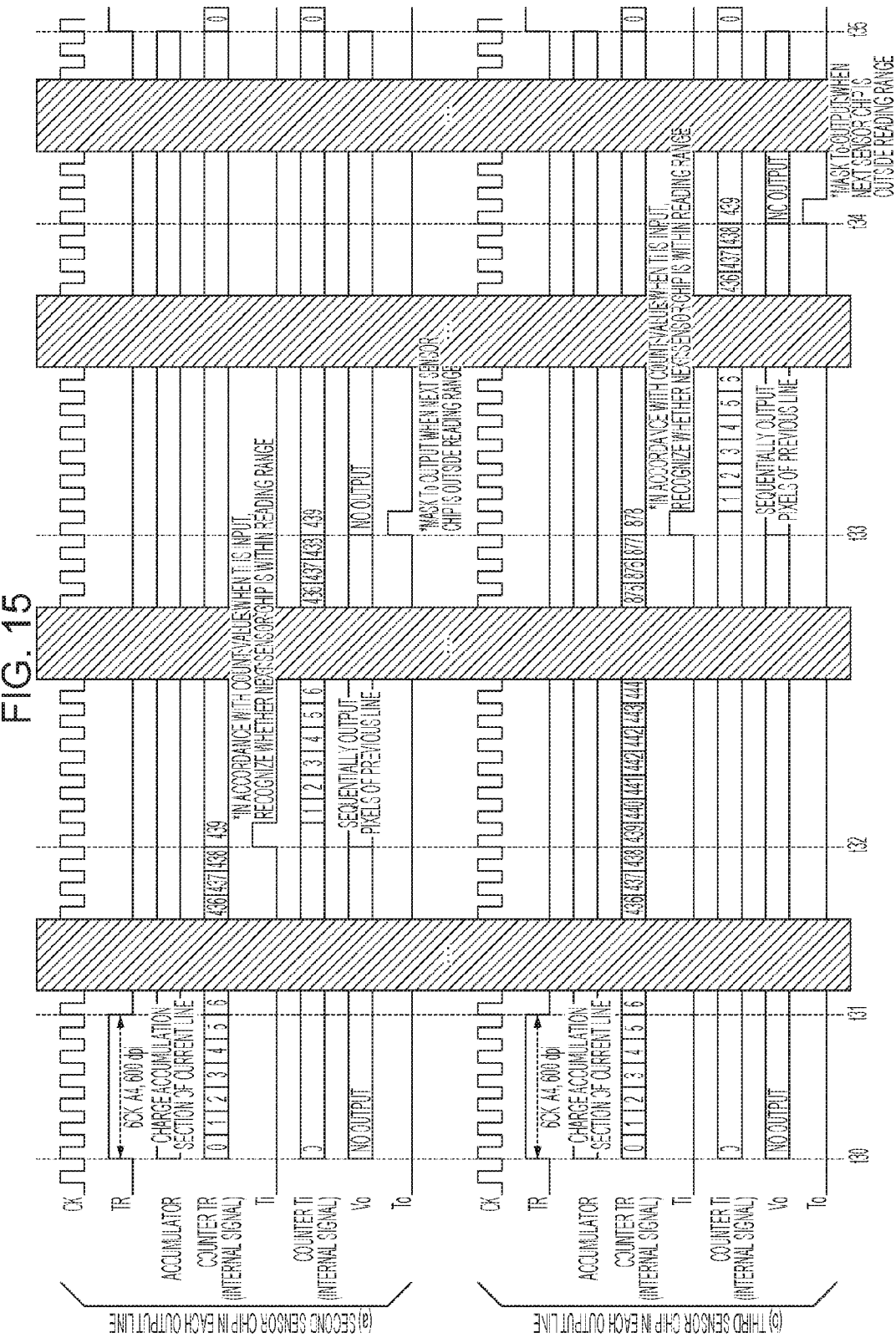
FIG. 15 includes timing charts of sensor chips according to the third embodiment.

FIG. 15 includes timing charts of sensor chips 103 according to the embodiment. FIG. 15(*a*) is a timing chart of a sensor chip 103B output second in each output line, and FIG. 15(*b*) is a timing chart of a sensor chip 103 output third in each output line. Note that it is assumed that the document size is A4 and the resolution is 600 dpi in the timing charts.

In the case where the document size recognizer 110B recognizes an A3 document (t31), To of the sensor chi 103B is output, regardless of the counted value of the count TR 111 (FIG. 15(*a*): t33, FIG. 15(*b*): t34). In the case where the document size recognizer 110B recognizes an A4 document (t31), if the counted value of the count TR 111 is the number of pixels equivalent to two chips (t33), To of the sensor chip 103 is masked (t34). Note that the number of pixels equivalent to two chips is 440 at 300 dpi, 878 at 600 dpi, and 1754 at 1200 dpi.

When To is masked, Ti is not input to the next sensor chip 103B, and accordingly, no pixel is output. In the case where the document size recognizer 110B recognizes an A4 document (t31), if the counted value of the count TR 111 is not the number of pixels equivalent to two chips (t32), To of the sensor chip 103B is output (t33).

Figure 17:
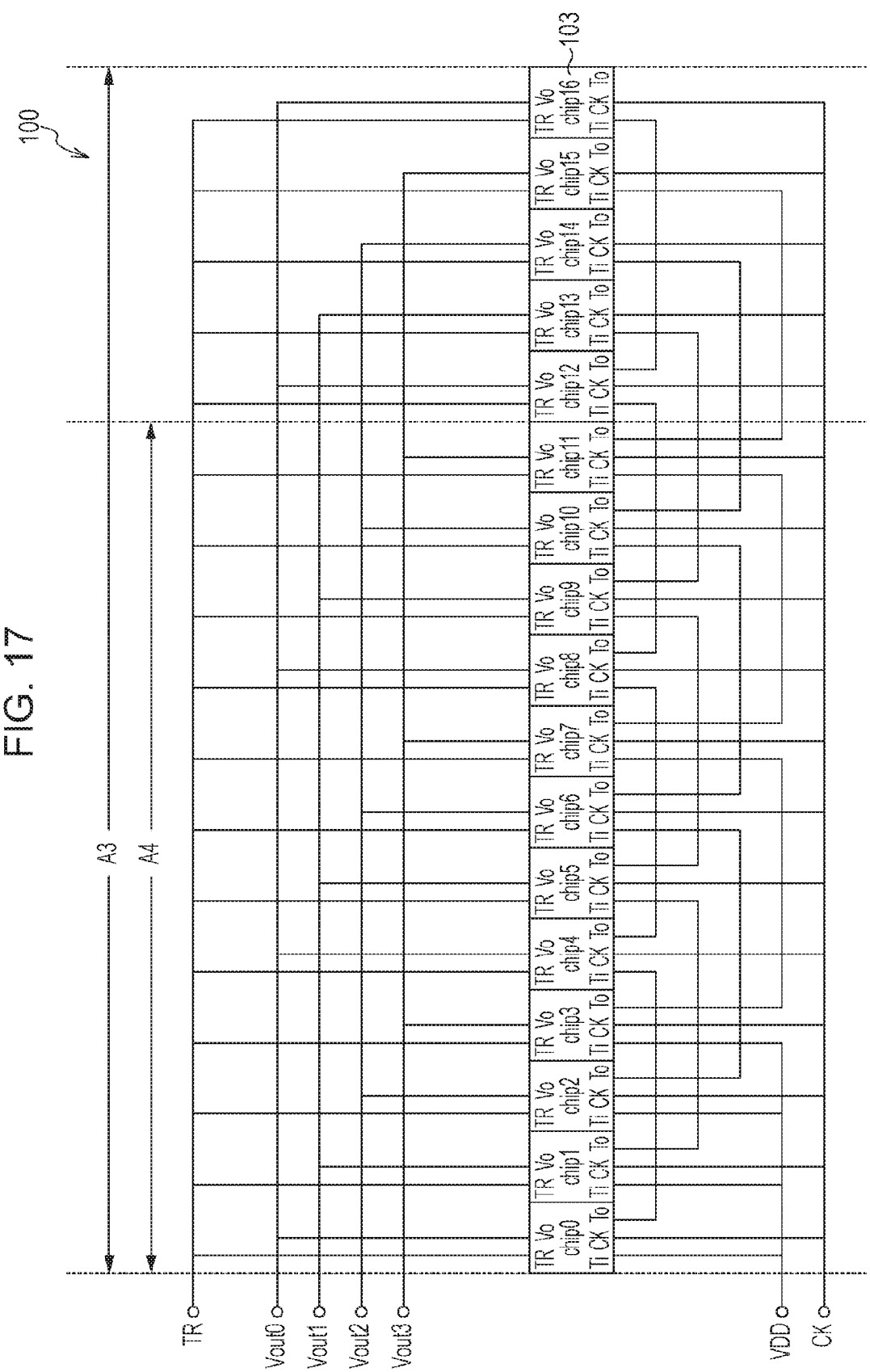
FIG. 17 is a diagram of a CIS according to the third embodiment.

FIG. 16 is an explanatory diagram of To through/mask control according to the embodiment. In the case where the document size recognizer 110B recognizes an A3 document, To passes through the image output controller 108B and is input to the pixel accumulation output unit 113, and a pixel signal is output. In the case where the document size recognizer 110B recognizes an A4 document and the counted value of the count TR 111 is the number of pixels equivalent to two chips, To is masked by the image output controller 108B and is not input to the pixel accumulation and output unit 113, and accordingly, no pixel is output. In the case where the document size recognizer 110B recognizes an A4 document and the counted value of the count TR 111 is not the number of pixels equivalent to two chips, To passes through the image output controller 108B and is input to the pixel accumulation and output unit 113, and a pixel signal of the next chip is output. FIG. 17 is a diagram of an A3-width CIS configuration using sensor chips 103 in FIG. 13. Since connections except for the fact that the document area signal (En) is deleted are the same as those in FIG. 7, descriptions thereof are omitted. Since CIS outputs in the case of reading an A3 document at 600 dpi in the embodiment are the same as CIS outputs in the case of A3 reading in the first embodiment, which is described using FIG. 8A, descriptions thereof are omitted.

Figure 18:
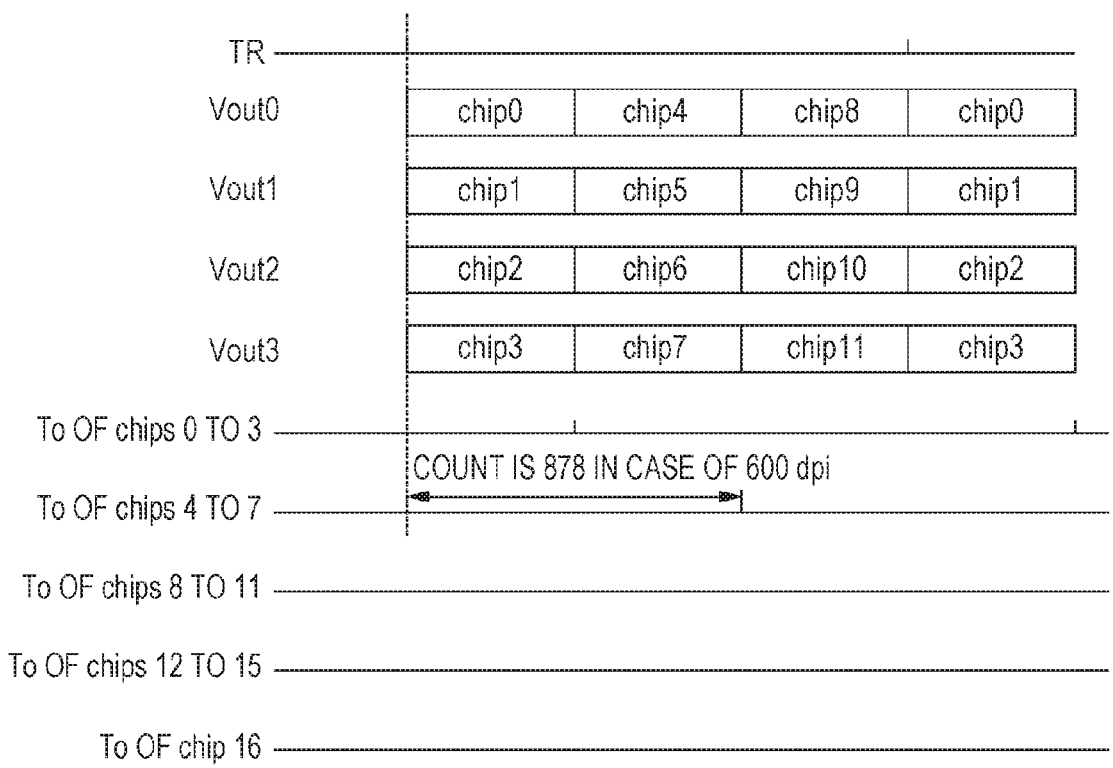
FIG. 18 is a CIS output diagram at the time of reading an A4 document according to the third embodiment.

FIG. 18 illustrates CIS outputs in the case of reading an A4 document at 600 dpi in the embodiment. Firstly, the line start pulse (TR) is input. By inputting the line start pulse (TR) for a pulse length equivalent to three clocks, the document size recognizer 110B of each sensor chip 103B recognizes an A4 document and a resolution of 600 dpi. In response to an input of the line start pulse (TR), chip 0, chip 1, chip 2, and chip 3 whose Ti are fixed at High start outputting pixel signals. When chip 0, chip 1, chip 2, and chip 3 end outputting pixel signals, To of chip 0, chip 1, chip 2, and chip 3 are input to Ti of chip 4, chip 5, chip 6, and chip 7, respectively, and chip 4, chip 5, chip 6, and chip 7 start outputting pixel signals. When chip 4, chip 5, chip 6, and chip 7 end outputting pixel signals, To of chip 4, chip 5, chip 6, and chip 7 are input to Ti of chip 8, chip 9, chip 10, and chip 11, respectively, and chip 8, chip 9, chip 10, and chip 11 start outputting pixel signals. Since the time point at which Ti is input to chip 8, chip 9, chip 10, and chip 11 is 878 clocks (the number of pixels equivalent to two chips) since TR is input, the document area recognizer 110B of each sensor chip 103B recognizes that the sensor chip 103B is the final chip in A4 reading in each output line. Therefore, when chip 8, chip 9, chip 10, and chip 11 end outputting pixel signals, To of chip 8, chip 9, chip 10, and chip 11 are not input to Ti of chip 12, chip 13, chip 14, and chip 15, respectively. As a result, chip 12, chip 13, chip 14, and chip 15 do not output pixel signals. Therefore, when chip 8, chip 9, chip 10, and chip 11 end outputting pixel signals, if the line start pulse (TR) is input, chip 0, chip 1, chip 2, and chip 3 of the next line can output pixel signals, without colliding with outputs of chip 12, chip 13, chip 14, and chip 15. Thus, the line time can be made shorter than that of reading an A3 document.

From the above, even when the configuration has wide sensor chips (such as A3-width sensor chips), the reading speed can be made faster in the case of reading a narrow document (such as an A4-width document). That is, this configuration can realize a reading speed equivalent to that of a reading apparatus with sensor chips having substantially the same width as the document width.

In the embodiment, the number of En terminals input to the document area recognizer 112 can be reduced. Although the maximum counted value of master clocks CK necessary for the counter TR 111 is 7 which is necessary for identifying A4/1200 dpi in the first embodiment, the maximum counted value is 878 which is necessary for counting the number of pixels equivalent to two chips at 1200 dpi in this embodiment. That is, the circuit dimensions become greater due to an increase in the number of bits of the counter TR 111, compared with the first embodiment.

Fourth Embodiment

In this embodiment, an image reading apparatus that adjusts the document reference to the center, like the ADF type, will be described.

The configuration of the sensor chips 103 is the same as that in the third embodiment, and the timing charts of the sensor chips 103 are the same as those in FIG. 15. Like the third embodiment, the document area recognizer 112 recognizes whether a sensor chip 103 is the final output chip, on the basis of the counted number of the counter TR 111 at the time the start pulse Ti of the sensor chip 103 is input; however, the counted number is different. For example, the counted number is 414 in the case of 300 dpi, 828 in the case of 600 dpi, and 1654 in the case of 1200 dpi. Note that this is the number of pixels equivalent to two chips, like the third embodiment. The counted number is different from the third embodiment since the sensor chip size and the number of pixels are different. The number of pixels is 414 pixels in the case of 600 dpi, for example. Thus, the counted number of the counter Ti 109 output by To is 414 pixels in the case of 600 dpi.

Figure 19:
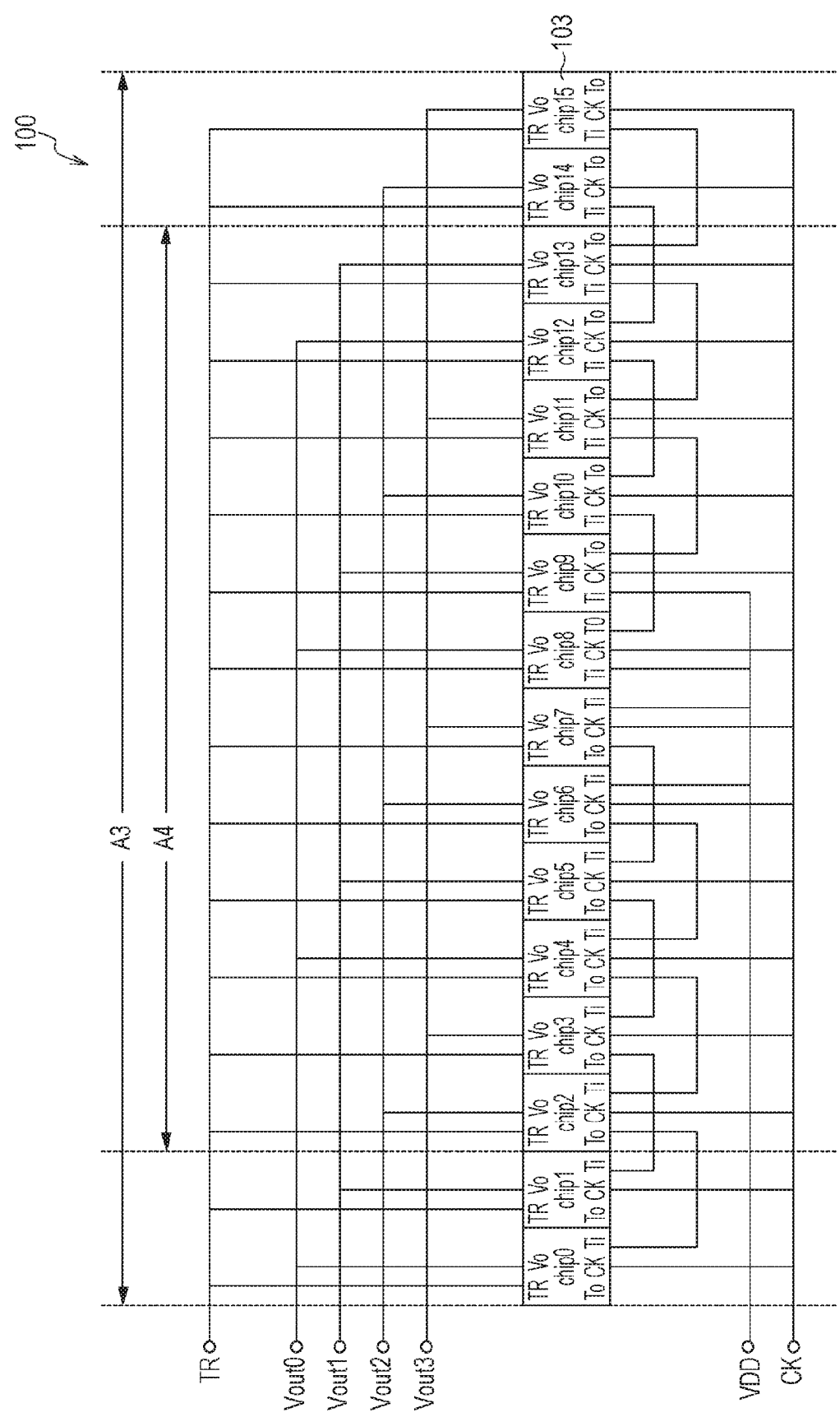
FIG. 19 is a diagram of a CIS according to a fourth embodiment.

FIG. 19 is a diagram of an A3-width CIS configuration using sensor chips 103. Here, only the arrangement and connections of the sensor chips 103 are described, and the descriptions of the LED 102 and the light guide 101 are omitted. The CIS has sixteen sensor chips 103 that are arranged in a main scanning direction, and the effective reading area of each sensor chip 103 is 17.5 mm. The sixteen sensor chips 103 will be denoted as chip 0 to chip 15 from the left. The document reference position is the right end of chip 7. The line start pulse (TR) is input to a TR terminal of each sensor chip 103, and the master clock (CK) is input to a CK terminal of each sensor chip 103. Since the CIS has four output lines Vout 0 to Vout 3, pixel signals are output in parallel to the AFE unit 21. In order that pixel signals can be output from Vout in the order of chip 7, chip 5, chip 3, and chip 1, To of each sensor chip 103 is connected to Ti of the next chip, and Vo of these sensor chips 103 are connected to Vout 0. In order that pixel signals can be output from Vout 1 in the order of chip 6, chip 4, chip 2, and chip 0, To of each sensor chip 103 is connected to Ti of the next chip, and Vo of these sensor chips 103 are connected to Vout 1. In order that pixel signals can be output from Vout 2 in the order of chip 8, chip 10, chip 12, and chip 14, To of each sensor chip 103 is connected to Ti of the next chip, and Vo of these sensor chips 103 are connected to Vout 2. In order that pixel signals can be output from Vout 3 in the order of chip 9, chip 11, chip 13, and chip 15, To of each sensor chip 103 is connected to Ti of the next chip, and Vo of these sensor chips 103 are connected to Vout 3. VDD is connected to Ti of chip 7, chip 6, chip 8, and chip 9 that first output pixel signals in the respective output lines.

Figure 20A:
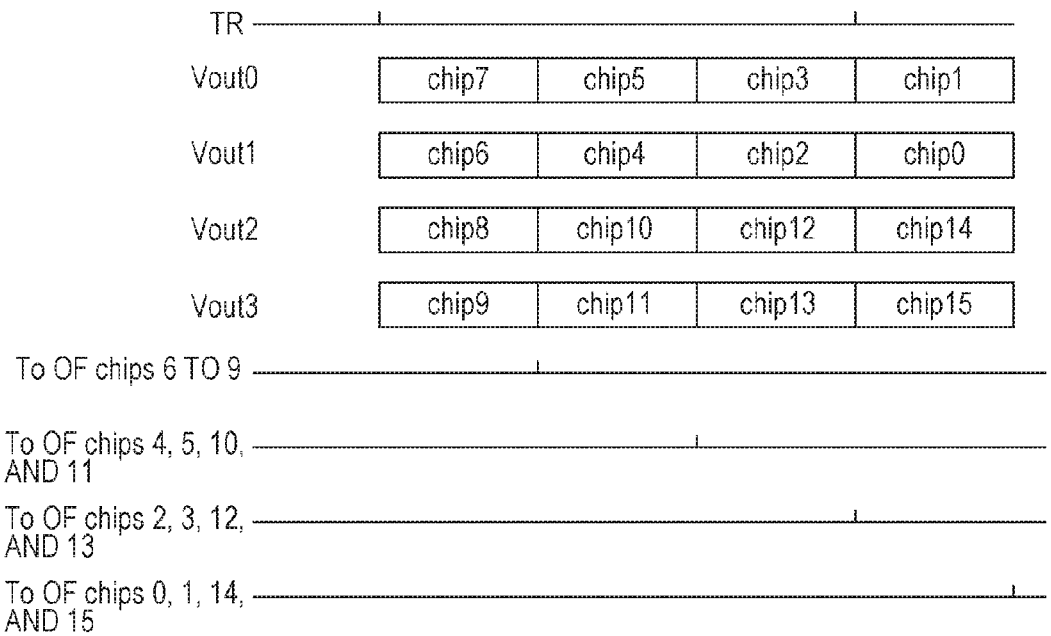
FIGS. 20A and 20B are diagrams illustrating CIS outputs at the time of reading according to the fourth embodiment.

FIG. 20A illustrates CIS outputs in the case of reading an A3 document at 600 dpi in the embodiment. Firstly, the line start pulse (TR) is input. By inputting the line start pulse (TR) for a pulse length equivalent to six clocks, the document size recognizer 110 of each sensor chip 103 recognizes an A3 document and a resolution of 600 dpi. In response to an input of the line start pulse (TR), chip 7, chip 6, chip 8, and chip 9 whose Ti are fixed at High start outputting pixel signals. When chip 7, chip 6, chip 8, and chip 9 end outputting pixel signals, To of chip 7, chip 6, chip 8, and chip 9 are input to Ti of chip 5, chip 1, chip 10, and chip 11, respectively, and chip 5, chip 4, chip 10, and chip 11 start outputting pixel signals. When chip 5, chip 4, chip 10, and chip 11 end outputting pixel signals, To of chip 5, chip 4, chip 10, and chip 11 are input to Ti of chip 3, chip 2, chip 12, and chip 13, respectively, and chip 3, chip 2, chip 12, and chip 13 start outputting pixel signals. When chip 3, chip 2, chip 12, and chip 13 end outputting pixel signals, To of chip 3, chip 2, chip 12, and chip 13 are input to Ti of chip 1, chip 0, chip 14, and chip 15, respectively, and chip 1, chip 0, chip 14, and chip 15 start outputting pixel signals. When chip 1, chip 0, chip 14, and chip 15 end outputting pixel signals and receive the line start pulse (TR), the next line star pixel output.

Figure 20B:
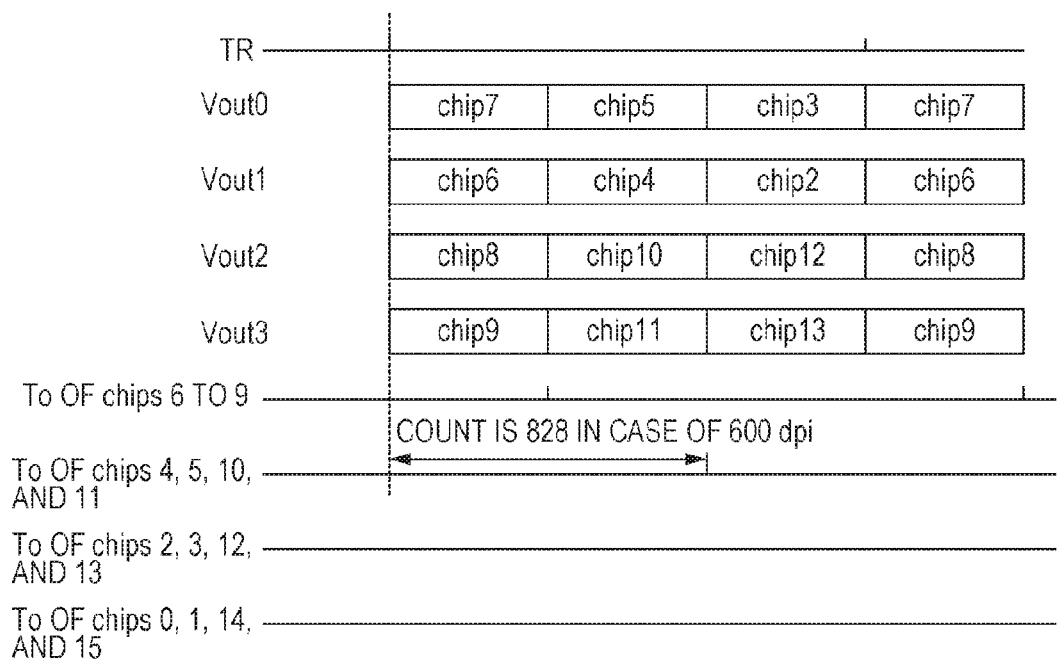

FIG. 20B illustrates CIS outputs in the case of reading an A4 document at 600 dpi in the embodiment. Firstly, the line start pulse (TR) is input. By inputting the line start pulse (TR) for a pulse length equivalent to six clocks, the document size recognizer 110 of each sensor chip 103 recognizes an A4 document and a resolution of 600 dpi. In response to an input of the line start pulse (TR), chip 7, chip 6, chip 8, and chip 9 whose Ti are fixed at High start outputting pixel signals. When chip 7, chip 6, chip 8, and chip 9 end outputting pixel signals, To of chip 7, chip 6, chip 8, and chip 9 are input to Ti of chip 5, chip 1, chip 10, and chip 11, respectively, and chip 5, chip 4, chip 10, and chip 11 start outputting pixel signals. When chip 5, chip 4, chip 10, and chip 11 end outputting pixel signals, To of chip 5, chip 4, chip 10, and chip 11 are input to Ti of chip 3, chip 2, chip 12, and chip 13, respectively, and chip 3, chip 2, chip 12, and chip 13 start outputting pixel signals. Since the time point at which Ti is input to chip 3, chip 2, chip 12, and chip 13 is 1200 clocks since TR is input, the document area recognizer 112 of each sensor chip 103 recognizes that the sensor chip 103 is the final chip in A4 reading in each output line. Even when chip 3, chip 2, chip 12, and chip 13 end outputting pixel signals, To of chip 3, chip 2, chip 12, and chip 13 are not input to Ti of chip 12, chip 13, chip 14, and chip 15, respectively. As a result, chip 12, chip 13, chip 14, and chip 15 do not output pixel signals. Therefore, when chip 8, chip 9, chip 10, and chip 11 end outputting pixel signals, if the line start pulse (TR) is input, chip 7, chip 6, chip 8, and chip 9 of the next line can output pixel signals, without colliding with outputs of chip 1, chip 0, chip 14, and chip 15. Thus, the line time can be made shorter than that of reading an A3 document.

From the above, even when the configuration has wide sensor chips (such as A3-width sensor chips), the reading speed can be made faster in the case of reading a narrow document (such as an A4-width document). That is, this configuration can realize a reading speed equivalent to that of a reading apparatus with sensor chips having substantially the same width as the document width.

In the embodiment, the reading speed can be made faster by using the image reading apparatus which adjusts the document reference to the center of the CIS.

Other Embodiments

The basic configuration of the present invention is not limited to those described above. For example, although the fourth embodiment has discussed by way of example the case where the document reference is adjusted to the center of the CIS, the document reference can be adjusted to the right end of the CIS by changing the connections of the sensor chips 103 in the CIS, as described above.

In addition, although the above-described embodiments have discussed that the image reading apparatus has the A3-width CIS 100, the embodiments are not limited thereto, and advantageous effects can be achieved in the case where the image reading apparatus has an another sized CIS by having a configuration and performing control like that in the above-described embodiments.

The present invention can also be implemented by executing the following process. That is, the process includes supplying software (program) implementing the functions of the above-described embodiments to a system or an apparatus via a network or various types of storage media, and reading and executing the program by a computer (or a CPU, an MPU, etc.) included in the system or apparatus. In addition, the program may be executed by one computer or by a plurality of computers in a cooperative manner. In addition, it is not necessary to implement all of the above-described processes in terms of software, and the entirety or part of the processes may be implemented by hardware such as an ASIC. In addition, a CPU is not limited to one that performs all the processes by itself, and a plurality of CPUs may perform the processes appropriately in a cooperative manner.

According to the present invention, in the case of reading a document that has a smaller width than the width of a document with the maximum readable size, the reading speed can be increased, and the reading time can be reduced, regardless of the size of an image sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of international Patent Application No. PCT/JP2014/084598, filed Dec. 26, 2014, which is hereby incorporated by reference herein in its entirety.

What is claimed is:
1. An apparatus comprising:
an image sensor that has a plurality of sensor chips having photoelectric conversion elements and that outputs pixel signals from the plurality of sensor chips through a plurality of output channels;
an identifying unit that identifies a width of a document to be read by the image sensor; and
a signal control unit that controls signals to be output from the image sensor,
wherein, in the image sensor, different sensor chips at an interval of a number of channels of the output channels are connected to each output channel, and wherein the signal control unit controls whether to output a pixel signal from each sensor chip based on the document width and whether to receive an end pulse of a previous sensor chip as a start pulse of each sensor chip, and wherein the identifying unit and the signal control unit are implemented by at least one processor.

2. The apparatus according to claim 1, wherein the signal control unit controls whether to output a pixel signal of each sensor chip by changing a pulse width of a line start pulse for the image sensor.

3. The apparatus according to claim 1, further comprising a determining unit that determines whether each sensor chip is arranged in an area of the document width, based on a signal from outside of the sensor chip, wherein the determining unit is implemented by at least one processor.

4. The apparatus according to claim 3, wherein the signal control unit controls whether to output a pixel signal from each sensor chip based on the identified document width and a determination result obtained by the determining unit.

5. The apparatus according to claim 1, further comprising a determining unit that determines whether each sensor chip is arranged in an area of the document width, based on a counted number since a line start pulse, wherein the determining unit is implemented by at least one processor.

6. The apparatus according to claim 1, wherein the identifying unit identifies a document size based on a pulse width of a line start pulse.

7. The apparatus according to claim 1, wherein adjacent sensor chips are connected to different output channels.

8. An apparatus comprising:

an image sensor that has a plurality of sensor chips having photoelectric conversion elements and that outputs pixel signals from the plurality of sensor chips through a plurality of output channels;

an identifying unit that identifies a width of a document to be read by the image sensor; and a signal control unit that controls signals to be output from the image sensor, wherein, in the image sensor, different sensor chips at an interval of the number of channels of the output channels are connected to each output channel, wherein the signal control unit controls whether to output a pixel signal from each sensor chip based on the identified document width and whether to output an end pulse of each sensor chip as a start pulse of a next sensor chip, and wherein the identifying unit and the signal control unit are implemented by at least one processor.

9. The apparatus according to claim 8, wherein the signal control unit controls whether to output a pixel signal of each sensor chip by changing a pulse width of a line start pulse for the image sensor.

10. The apparatus according to claim 8, further comprising a determining unit that determines whether each sensor chip is arranged in an area of the document width, based on a signal from outside of the sensor chip, wherein the determining unit is implemented by at least one processor.

11. The apparatus according to claim 8, further comprising a determining unit that determines whether each sensor chip is arranged in an area of the document width, based on a counted number since a line start pulse, wherein the determining unit is implemented by at least one processor.

12. The apparatus according to claim 8, wherein the identifying unit identifies a document size based on a pulse width of a line start pulse.

13. The apparatus according to claim 8, wherein adjacent sensor chips are connected to different output channels.

14. A control method for an apparatus including an image sensor that has a plurality of sensor chips having photoelectric conversion elements and that outputs pixel signals from the plurality of sensor chips through a plurality of output channels, comprising:

identifying a width of a document to be read by the image sensor; and controlling signals to be output from the image sensor, wherein, in the image sensor, different sensor chips at an interval of the number of channels of the output channels are connected to each output channel, and wherein whether to output a pixel signal from each sensor chip is controlled in the signal controlling based on the identified document width and whether to receive an end pulse of a previous sensor chip as a start pulse of each sensor chip.

15. The method according to claim 14, wherein the controlling signals controls whether to output a pixel signal of each sensor chip by changing a pulse width of a line start pulse for the image sensor.

16. The method according to claim 14, further comprising determining whether each sensor chip is arranged in an area of the document width, based on a signal from outside of the sensor chip.

17. The method according to claim 14, further comprising a determining whether each sensor chip is arranged in an area of the document width, based on a counted number since a line start pulse.

18. The method according to claim 14, wherein the identifying identifies a document size based on a pulse width of a line start pulse.

19. A control method for an apparatus including an image sensor that has a plurality of sensor chips having photoelectric conversion elements and that outputs pixel signals from the plurality of sensor chips through a plurality of output channels, comprising:

identifying a width of a document to be read by the image sensor; and controlling signals to be output from the image sensor, wherein, in the image sensor, different sensor chips at an interval of the number of channels of the output channels are connected to each output channel, and whether to output a pixel signal from each sensor chip is controlled in the controlling signals based on the identified document width and whether to output an end pulse of each sensor chip as a start pulse of a next sensor chip.

20. The method according to claim 19, wherein the controlling signals controls whether to output a pixel signal of each sensor chip by changing a pulse width of a line start pulse for the image sensor.

21. The method according to claim 19, further comprising determining whether each sensor chip is arranged in an area of the document width, based on a signal from outside of the sensor chip.

22. The method according to claim 19, wherein the identifying identifies a document size based on a pulse width of a line start pulse.

* * * * *